(12) United States Patent
Safavi

(10) Patent No.: US 10,958,585 B2
(45) Date of Patent: Mar. 23, 2021

(54) METHODS AND APPARATUS FOR FACILITATING FAULT DETECTION AND/OR PREDICTIVE FAULT DETECTION

(71) Applicant: Juniper Networks, Inc., Sunnyvale, CA (US)

(72) Inventor: Ebrahim Safavi, Santa Clara, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 66 days.

(21) Appl. No.: 16/237,677

(22) Filed: Dec. 31, 2018

(65) Prior Publication Data

US 2020/0213236 A1 Jul. 2, 2020

Related U.S. Application Data

(60) Provisional application No. 62/787,234, filed on Dec. 31, 2018.

(51) Int. Cl.
| | | |
|---|---|---|
| *H04L 12/851* | (2013.01) | |
| *G06N 20/00* | (2019.01) | |
| *H04W 24/02* | (2009.01) | |

(52) U.S. Cl.
CPC ......... *H04L 47/2441* (2013.01); *G06N 20/00* (2019.01); *H04W 24/02* (2013.01)

(58) Field of Classification Search
CPC ...... G06N 20/00; G06N 3/0454; G06N 3/088; G06N 3/006; G06N 3/02; G06N 3/0445;

(Continued)

(56) References Cited

U.S. PATENT DOCUMENTS

| | | | |
|---|---|---|---|
| 6,732,149 B1* | 5/2004 | Kephart | G06Q 10/107 709/206 |
| 2007/0006044 A1* | 1/2007 | Dan | H04L 41/0663 714/38.14 |

(Continued)

FOREIGN PATENT DOCUMENTS

| | | |
|---|---|---|
| EP | 3537658 | 9/2019 |
| WO | 2018103453 | 6/2018 |

OTHER PUBLICATIONS

"International Application Serial No. PCT US2019 068811, International Search Report dated Apr. 15, 2020", 5 pgs.

(Continued)

*Primary Examiner* — Michael A Keller
*Assistant Examiner* — Thao D Duong
(74) *Attorney, Agent, or Firm* — Schwegman Lundberg & Woessner, P.A.

(57) ABSTRACT

Methods and apparatus for automatically identifying and correcting faults relating to poor communications service in a wireless system, e.g., in real time, are described. The methods are well suited for use in a system with a variety of access points, e.g., wireless and/or wired access points, which can be used to obtain access to the Internet or another network. Access points (APs), which have been configured to monitor in accordance with received monitoring configuration information, e.g. on a per access point interface basis, captures messages, store captured messages, and in collaboration with network monitoring apparatus which can be in an AP or external thereto, use message sequences to determine a remedial action to be automatically taken when poor service is likely as may be predicted based on the detected message sequence between a UE and one or more APs.

20 Claims, 15 Drawing Sheets

(58) Field of Classification Search
CPC .. H04B 17/309; H04B 17/318; H04B 7/0695; H04B 7/088; H04B 7/0617; H04B 7/0626
See application file for complete search history.

(56) References Cited

U.S. PATENT DOCUMENTS

2019/0089599 A1* 3/2019 Savalle ................... H04L 67/34
2019/0288904 A1* 9/2019 Cheng ................. H04L 41/0654

OTHER PUBLICATIONS

"International Application Serial No. PCT US2019 068811, Written Opinion dated Apr. 15, 2020", 12 pgs.
"Understanding LSTM Networks", Colah's Blog [Online]. Retrieved from the Internet: URL: http: colah.github.io posts2015-08-Understanding-LSTMs , (Aug. 27, 2015), 17 pgs.

* cited by examiner

| Index | Message | Comment |
|---|---|---|
| 1 | STA_AUTHORIZED | authorized STA (E.g. WPA2-PSK handshake completion) |
| 2 | STA_DEAUTH | de-authenticate the STA |
| 3 | STA_DHCP_ACK | DHCP ACK for STA (STA has an assigned IP address) |
| 4 | FLOW_REDIRECTED | Client flow is redirected |
| 5 | STA_ASSOC_IND | associated STA |
| 6 | STA_DHCP_STUCK | DHCP client is getting offers but not advancing to the ACK stage and not getting an IP address |
| 7 | STA_REASSOC_IND | re-associated STA |
| 8 | ARP_DEFGW_TIMEOUT | Client Failed to get ARP resp of Def-GW |
| 9 | DNS_SERVER_NOT_RESPONDING | DNS server not responding |
| 10 | STA_AUTH_IND | 802.11 Authentication success or failure or deny |
| 11 | LOCAL_SUPPORT_PAGE | Events relating to Local Support Page redir or page viewed |
| 12 | STA_DHCP_NAK | Send DHCP NAK info to cloud |
| 13 | STA_DEAUTH_IND | deauthenticated STA |
| 14 | STA_AUTH_IND_FT | FT (802.11r - Fast BSS Transition) success or failure. (NOTE older APs < Mar 2017 also use this for OKC authenticated; see Auth_Algo field to distinguish OKC from FT) |
| 15 | WXLAN_PAPI_TIMEOUT | Wxlan Policy PAPI query timedout |
| 16 | STA_DISASSOC | disassociated STA |
| 17 | STA_DNS_OK | Client DNS success |
| 18 | STA_AUTHORIZATION_FAILED | ad passwords, STA/AP crypto mismatches |
| 19 | DEFGW_ARP_TX_CONTINUOUS | Def Gw ARP response continuous |
| 20 | ARP_DEFGW_SUCCESS | Client got ARP resp of Def-GW |
| 21 | STA_DISASSOC_IND | disassociated STA |
| 22 | DHCP_POOL_EXHAUSTED | |

Figure 6A

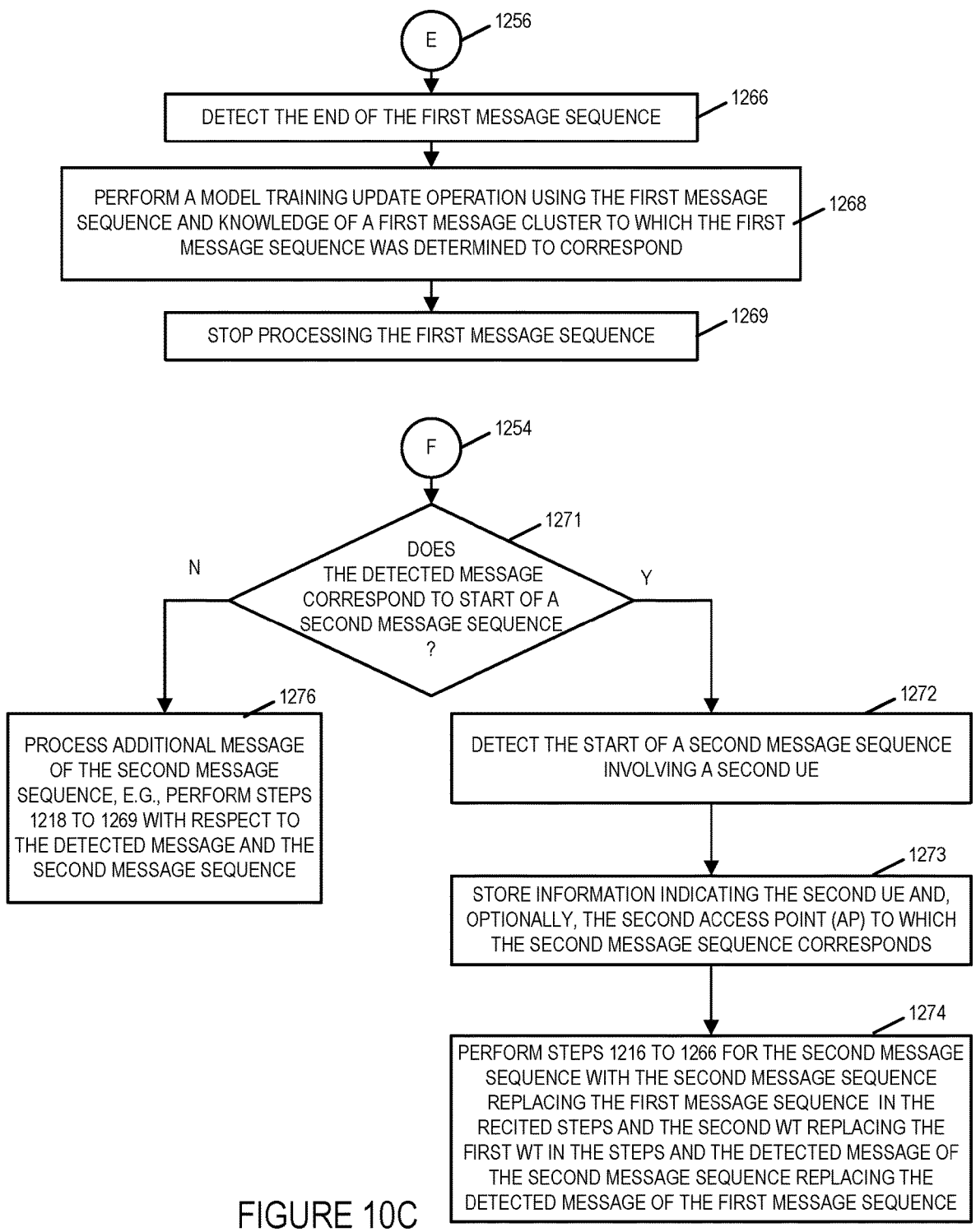

METHODS AND APPARATUS FOR FACILITATING FAULT DETECTION AND/OR PREDICTIVE FAULT DETECTION

RELATED APPLICATIONS

The present application claims the benefit of U.S. Provisional Patent Application Ser. No. 62/787,234 filed on Dec. 31, 2018 and which is hereby expressly incorporated by reference in its entirety.

FIELD

The present application relates to wireless communications and, more particularly, to methods and/or apparatus for detecting faults in wireless networks, predicting network faults or adverse operating conditions and/or automatically remediating faults or taking preventive action.

BACKGROUND

Wireless mobile devices may experience communications issues that can be due to a variety of reasons. Lack of service, e.g., corresponding to a dead zone may be due to an Access Point (AP) fault, backbone or other issue, etc. Failure to be able to access a web site or establish a communications session may be due to a DHCP error or for other reasons.

With existing systems when a user experiences an issue he either awaits for the fault to clear, retries the failed operation, or contacts the network administrator requesting a resolution of the problem. In many cases the user and/or system administrator waits for faults to occur and then attempts to identify the fault and take corrective action.

It can be difficult to diagnose and troubleshoot problems in wireless systems in part because devices have many different parameters such as device type, hardware, software and they may interact with various access points within different wireless channels. Connectivity problems may be due to miss-configurations of applications running on a device, poor wireless signal conditions, wireless device operating system (OS) specific issues, problems relating to the network backhaul i.e., from APs to the backend network and/or issues with a particular access point. Access point issues may stem from configuration, loading, malfunctioning component in a device, faulty equipment and/or other issues.

As part of establishing and proceeding with a communications session or web server access operation a user equipment (UE) may send and receive several messages to an access point. A failure to receive or successfully communicate a message, or a message indicating a failure or a problem with completing a portion of the communications establishment process may be the result of a variety of different reasons. Excessive delays in receiving responses to messages may result in a communication failure. The need for a message to be retransmitted and/or other action to be taken may not prevent successful communication but may result in an unintended delay in communication. While a failure to ultimately complete a sequence of messages relating to a communications session may result in a communications failure that may be reported by the UE or another network device, in many cases the UE will simply move to a new location and access the network via a different AP or different network altogether. Therefore, the same fault may affect multiple UEs and go undetected by a network administrator for some time due to the lack of automated fault detection and reporting in many systems and/or the need for a complete communications failure before a communications problem is reviewed to identify the source of the failure.

It would be desirable if methods and apparatus could be developed which could be used to detect faults, identify system issues which can negatively impact performance, recognize conditions or settings, or automatically remediate the cause of a failure, fault, or an anomaly and also take remedial or preventive action on one or more such conditions in an automated manner. e.g., without the need for the user of a UE reporting a communications failure or even before the user of the UE is adversely impacted to such a level that the user suffers noticeable communications problems. Ideally the detection of faults or other conditions which can negatively affect communications performance and the taking of automated remedial action would occur in at least some but not necessarily all embodiments before a user contacts an information technology (IT) department and opens a ticket (request for corrective action) against the system.

It would be desirable if in some but not necessarily all embodiment it was possible to identify communications faults in a wireless system including an AP in real-time, predict them before users are adversely impacted, and/or take automated remedial action to correct the root cause of faults without requiring a user of a UE to actively report the faults or communications failures while interacting with an AP.

SUMMARY OF THE INVENTION

Methods and apparatus for monitoring message sequences between a wireless terminal (WT), e.g., User Equipment device referred to herein as a UE device and one or more access points, e.g., base station, are described. The terms WT and UE may be used interchangeably in the present application and are intended to cover devices such as cell phones, portable end user devices as well as personal computer or other devices that may be used by a user to communicate wirelessly via an AP. The term AP and base station are also used interchangeably and are intended to cover WiFi APs, Bluetooth AP, cellular AP and/or other wireless APs that can be used to obtain connectivity to a network.

The detected message sequences between a WT and one or more APs that are monitored and processed, may, and sometimes do, correspond to an attempt to establish a communications session with another device, e.g., a network component, a WT or a Web server. The monitored message sequences can be and sometimes are sequences of network control related messages as opposed to user data messages such as voice or text messages. In various embodiments during use, handshaking message sequences between individual WTs and at least one AP are analyzed to determine if they correspond to predetermined clusters of message sequences, with the message sequences being represented by message sequence vectors, known to correspond to a particular communications problem and/or corrective action. If a detected message sequence is determined to correspond to a cluster of messages associated with poor communications service, e.g., due to a communications problem, a corresponding corrective action is automatically taken by the communications network, e.g., a transmission power adjustment is made, a defective component is replaced by redirecting messages or via another action such as a failover action or switch over between redundant network components. In some embodiments the determination as to whether a message sequence corresponds to a message sequence cluster is made by determining if a message sequence vector corresponding to a message sequence corresponds to a message sequence vector cluster representing a given cluster of message sequences.

In addition, reports about message sequences determined to correspond to poor communications service are generated and provided to a network administrator system along with information on the action which was taken to correct the problem causing the poor communications service.

By monitoring individual message sequences between WTs and APs, identifying individual message sequences corresponding to message sequence clusters known to correspond to poor communications service, many problems can be identified and corresponding corrective actions can be, and sometimes are, taken, e.g., in real time while a communication session or attempt by a WT to establish communication via an AP is still ongoing, without the need for a user of a WT to communicate or report a problem. In fact, in many circumstances, poor service can be corrected before a communications failure is detected by the user of the WT and without a complete failure. For example, a delay resulting from a network issue may not result in a communication failure but may still result in a poor service experience if the cause of the delay is not corrected.

Thus, at least in some embodiments by monitoring a message sequence between a WT and at least one AP, matching the message sequence to a message sequence cluster known to correspond to poor service, and having a corresponding known corrective actions associated with the message sequence cluster to which the detected sequence is matched, a corrective action to be taken can be determined and implemented to avoid or ameliorate poor service in real time. This can and in some embodiments is done for multiple message sequences between different WTs and the same or different APs while one or more communications sessions or attempts to establish communications sessions are ongoing.

In some embodiments individual APs are configured to communicate detected message sequences, e.g., communications control and/or networking message sequences, including message sequences such as those sometimes referred to as handshaking message sequences between WTs and one or more APs to a message monitoring device responsible for matching the message sequences detected by the monitoring to the message monitoring device which can be implemented as a core network component. The communications control message sequences should not be confused with messages used to communicate user data such as text messages, voice mail messages, etc. which are not used for communications or network related control signaling. In some embodiments, handshaking messages are forwarded to the message monitoring device from the AP or APs in the communications system. The monitoring device can be implemented at a centralized location where message sequences corresponding to multiple APs are processed and acted upon. The communication of communications related control messages to the central monitoring device need not interfere with the normal communication of the messages between the WTs and one or more APs since the messages, or portions of the messages, are copied and forwarded to the message monitoring device in some embodiments and the message monitoring device need not be in the direct communications path of the messages. As noted above the forwarded messages are control related messages, e.g., association, connection establishment, address information, failure and other control related messages, used in the communications network. Such messages should not be confused with user data messages such as voice mail, text messages, etc. In other embodiments the message monitoring device is implemented directly in one or more APs in which case the monitoring device can and sometimes does directly observe the communications of communications control/handshaking messages between the AP in which the monitoring device is located and the WTs which obtain network connectivity via the AP in which the monitoring device is located. For privacy and/or network bandwidth reasons, it should be appreciated that while we discuss message copying and monitoring, portions of communications control/handshaking messages are monitored.

While many features relate to the detection of message sequences corresponding to a cluster of messages associated with poor service and taking a corrective action, various features relate to a training phase which may be implemented once before mapping message sequences to message sequence clusters is performed, e.g., in real time, for corrective action purposes.

Various features relate to the use of machine learning, e.g., during a training phase, in which message sequences are arranged into clusters and models of the clusters are generated sometimes in the form of message sequence vector values and/or value ranges which can be used to determine if a message sequence being monitored corresponds to a message sequence cluster, e.g., known to be associated with poor service and for which a corrective action to be taken is also associated.

In various embodiments sequences of messages between WTs and one or more APs are monitored. Communications between different WTs and APs are treated as different message sequences. Thus message sequences maybe distinguished based on the WT involved with the communications, e.g., the WT trying to set up the network communications. Message sequences in some, but not necessarily all embodiments, start with the same message. The end of a successful message sequence is detected by a message indicative of the end of the message sequence. In some embodiments, detection of the start of a new message sequence is based on a message indicating the start of a message sequence, without detecting successful completion of the previous message sequence involving the same WT i.e., the new message sequence is interpreted as the previous message sequence between said WT and APs having terminated without success, e.g., a message sequence failure. It should be appreciated that one a WT starts a message sequence, the message sequence may continue with messages being sent to one or more APs prior to the individual WT starting a new message sequence. The detected message sequences are stored. The stored message sequences are then labeled, e.g., by a human or via a machine, as corresponding to a good communications service or poor communication service. Failure for the message sequence to properly terminate, the repeating or redirection of messages in the message sequence or other service criteria can, and sometimes are, used for automatically determining if a detected message sequence to be used for training purposes corresponds to good or bad service. With the set of training sequences having been labeled, the message sequences are processed first i.e., for each message sequence being used for the training purpose, a corresponding message sequence vector is generated. Generation of message sequence vectors may be sequential, first generating a message vector for the first message in the sequence and then updating the overall message sequence vector by adding new messages in the sequence in a given sequence. Message vectors may be based on features such as how often the particular message occurs in training set of vectors, the average relative spacing of a particular message from another message, the probability that a message occurs at a particular position in message sequences or any of another number of factors. In some embodiments each message vector is an N dimensional vector, i.e., a vector ($e\_1, e\_2, \ldots, e\_N$) with N elements where each element in the vector is a numerical value. Thus, in the case where N is three, a message vector would include 3 elements. Larger vectors are often used with the number of elements, N, in a vector ranging between 10 and 20 in some embodiments but larger numbers of elements are also possible.

A message sequence vector is generated from the vectors corresponding to messages in a sequence. For example a sequence of 5 messages may have the message vectors of the 5 messages processed and combined to generate a message vector sequence for the sequence of 5 messages. The message sequence vectors may and in some embodiments do include the same number of elements as the individual message vector. Thus, a message sequence vector generated from a sequence of 5 messages and corresponding message vectors having N elements each would, in some embodiments result in a message sequence vector also having N elements. For example if 5 message sequence was processed and the message vectors corresponding to the detected message sequence each had 20 elements, the message sequence vector would also have 20 elements, e.g., values, in some embodiments. In other words, the dimension of a message sequence vector may be and often is the same as the dimension of the message vectors that are used to generate the message sequence vector.

With message sequence vectors having been generated for the training message sequences, and the sequences having been labeled as corresponding to good or poor services, the message sequence vectors are processed to put them in clusters, e.g., clusters corresponding to good or poor service.

In some embodiments messages sequences indicative of poor service are grouped into clusters based on the different root causes and or different required remedial actions to correct the associated poor service condition. As such the system may and often does identify many message sequence clusters corresponding to poor service however with each of the different clusters corresponding to a different root cause which resulted in service degradation. Machine learning techniques can be used to cluster the good message sequences and poor message sequences.

As a result of the machine learning, a definition, also sometimes referred to a cluster model or cluster definition, for each cluster of message sequences identified by the machine learning process is generated. The cluster definition may be in the form of a message sequence vector with variance (+/−) ranges for each of the vector elements forming the message sequence vector defining a cluster. The (+/−) ranges for different individual vector elements may be different for different elements of a message vector sequence defining a message cluster. The ranges may be and sometimes are determined using machine learning techniques implemented to identify message clusters.

Both the values and variance ranges of each element in a message sequence vector defining a message cluster are normally determined through machine leaning on the labeled set of training message vector sequences.

In other embodiments a cluster definition defines a volume occupied by the cluster in the N dimensional space. In some embodiments the cluster definition includes an N dimensional vector indicating the centroid (center point) of the cluster and a separate value for each of the N dimensions indicating how far the volume extends in a given dimension from the specified centroid. In some such embodiments if a vector is within the volume which defines a cluster it is considered to correspond to the cluster.

Clusters of message sequences which have been identified and defined during training, are labeled as part of the training process, e.g., by a network or training administrator as corresponding to good or poor communications services. In the case of a message sequence cluster corresponding to poor service, a corrective action to be taken is associated with the cluster. The corrective action associated with a message sequence cluster known to correspond to poor service will depend on the root cause of the poor service for a given message sequence cluster. The labeling of good/bad message sequences can be skipped in some embodiments where the message clusters being labeled as corresponding to good or poor service after the detected message sequences are grouped into clusters.

Thus, during the training phase which precedes the real time use phase, message sequence clusters are defined, labeled as corresponding to good or poor service and for some or all of the individual message sequence clusters identified as corresponding to poor service, a corresponding corrective action is associated and stored.

Once the initial training is complete, messages between WTs and APs are monitored, a message sequence vector is generated for each detected message sequence and updated once a new message is observed, and the message sequence vector is compared to predetermined message sequence cluster definitions. If a message sequence is determined to correspond to a cluster associated with poor service, a notification and or report is generated and provided to a network administrator device or system and, when a corrective action is associated with the message sequence cluster to which the message sequence had been determined to correspond, the corrective action is automatically implemented.

Message sequences encountered during use of the system can include previously unknown message sequences and still match to a message sequence cluster since the definition of message sequences corresponding to the cluster include a set of vector elements with ranges. A message sequence having a set of vector elements which fall within the set of vector value ranges used to define a message cluster with poor service will be determined to match the message cluster even though the exact set of messages in the detected message sequence may not have been in the set of training data used to generate the message clusters and corresponding definitions. In this way, message sequences can be matched to a poor service condition and corrective action taken even if the exact message sequence was not part of the message sequence training data set.

Detection of new messages may, and sometimes does, initiate a retraining operation. Thus in at least some embodiments over time as the set of observed messages and message sequences increases the definitions of message clusters can be further refined.

The methods and apparatus are not limited to particular machine learning and clustering techniques and a wide variety of techniques can be used to generate the message cluster definitions which can be associated with corrective actions in accordance with the invention.

An exemplary method of operating an apparatus in accordance with some embodiments, comprises: storing in a storage device message sequence vector to message sequence vector cluster mapping information for a plurality of message sequence clusters associated with poor communications service; storing for at least some individual message sequence clusters, in said plurality of message sequence clusters associated with poor communications service, a corresponding corrective action; detecting a message of a first ongoing message sequence involving a first UE device and at least one access point; updating a first message sequence vector based on at least the detected message of the first ongoing message sequence; determining if the first ongoing message sequence corresponds to one of the plurality of message sequence clusters associated with poor communications service; and in response to determining that the first ongoing message sequence corresponds to one of the plurality of message sequence clusters associated with poor communications service, performing the corrective action corresponding to the one of the plurality of message sequence clusters to which the first ongoing message sequence is determined to correspond.

An exemplary apparatus, in accordance with some embodiments, comprises: a processor configured to: store in a storage device message sequence vector to message sequence vector cluster mapping information for a plurality of message sequence clusters associated with poor communications service; store for at least some individual message sequence clusters, in said plurality of message sequence clusters associated with poor communications service, a corresponding corrective action; detect a message of a first ongoing message sequence involving a first UE device and at least one access point; update a first message sequence vector based on at least the detected message of the first ongoing message sequence; determine if the first ongoing message sequence corresponds to one of the plurality of message sequence clusters associated with poor communications service; and in response to determining that the first ongoing message sequence corresponds to one of the plurality of message sequence clusters associated with poor communications service, perform the corrective action corresponding the one of the plurality of message sequence clusters to which the first ongoing message sequence is determined to correspond.

While various embodiments have been discussed in the summary above, it should be appreciated that not necessarily all embodiments include the same features and some of the features described above are not necessary for all embodiments. Numerous additional features, embodiments and benefits of various embodiments are discussed in the detailed description which follows.

BRIEF DESCRIPTION OF THE FIGURES

FIG. 6A is an exemplary message dictionary in the form of a table listing messages that may be used between a WT and one or more APs in the system of FIG. 1.

FIG. 10C is a third part of the flow chart showing the method that can be used in the system of FIG. 1.

FIG. 10 shows how FIGS. 10A, 10B and 10C are to be combined to form a single flow chart showing the method that can be used in the system of FIG. 1.

DETAILED DESCRIPTION

Figure 1:
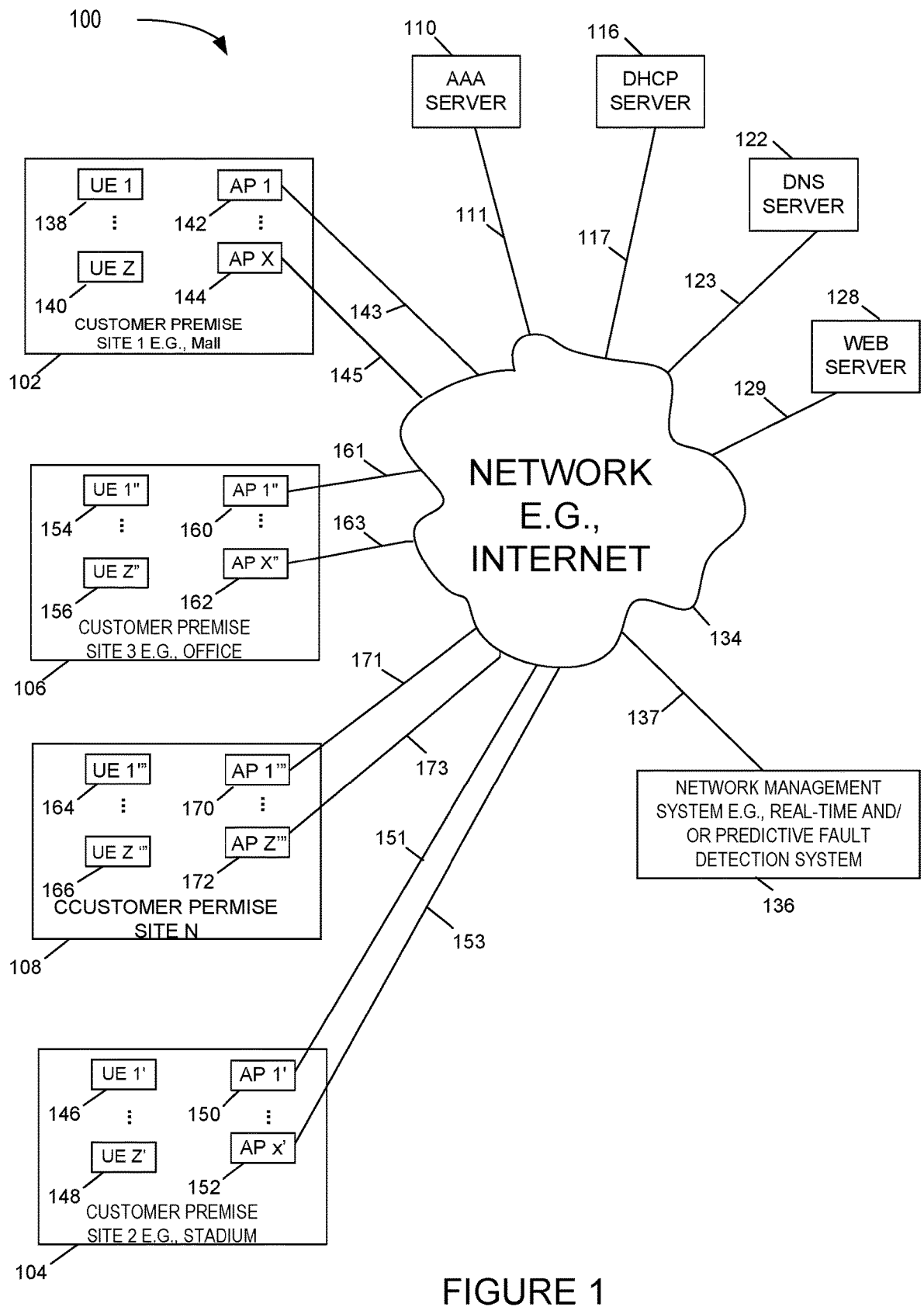
FIG. 1 is a block diagram illustrating an exemplary system including a communications network in which the present invention is implemented.

FIG. 1 is a drawing of an exemplary system 100 implemented in accordance with an exemplary embodiment. Exemplary system 100 includes a plurality of access points (AP1 142, . . . , AP X 144, AP 1' 150, . . . , AP X' 152, AP 1" 160, . . . , AP X" 162, AP 1'" 170, . . . , AP X'" 172), a plurality of Authentication, Authorization and Accounting (AAA) servers (only one AAA server 110 is shown), a plurality of Dynamic Host Configuration Protocol (DHCP) servers (only one DHCP server 116 is shown), a plurality of Domain Name System (DNS) servers (only one DNS server 122 is shown), a plurality of Web servers (only one Web server 128 is shown), and a network management system (NMS) 136, e.g., a real-time and/or predictive fault detection system, which are coupled together via network 134, e.g., the Internet and/or an enterprise intranet. Network communications links (143, 145, 151, 153, 161, 163, 171, 173) couple the access points (AP1 142, AP X 144, AP 1' 150, AP X' 152, AP 1" 160, AP X" 162, AP 1'" 170, AP X'" 172), respectively, to network 134. Network communications link 111 couple the AAA servers (only AAA server 110 is shown) to network 134. Network communications link 117 couple the DHCP servers (only one DHCP server 116 is shown) to network 134. Network communications link 123 couple the DNS servers (only one DNS server 122 is shown) to network 134. Network communications link 129 couple the Web servers (only one Web server 128 is shown) to network 134. Exemplary system 100 further includes a plurality of user equipment devices (UE 1 138, . . . , UE Z 140, UE 1' 146, . . . , UEZ' 148, UE 1" 154, . . . , UE Z" 156, UE 1''' 164, UE Z''' 166). At least some of the UEs (138, 140, 146, 148, 154, 156, 164, 166) are wireless devices which may move throughout system 100.

In exemplary system 100 sets of access points are located at different customer premise site. Customer premise site 1 102, e.g., a mall, includes access points (AP 1 142, . . . , AP X 144). Customer premise site 2 104, e.g., a stadium, includes access points (AP 1' 150, . . . , AP X' 152). Customer premise site 3 106, e.g., an office, includes access points (AP 1" 160, . . . , AP X" 162). Customer premise site N 108 includes access points (AP 1''' 170, . . . , AP X''' 172). As shown in FIG. 1, UEs (UE 1 138, . . . , UE Z 140) are currently located at customer premise site 1 102; UEs (UE 1' 146, . . . , UE Z' 148) are currently located at customer premise site 2 104; UEs (UE 1" 154, . . . , UE Z" 156) are currently located at customer premise site 3 106; and UEs (UE 1''' 164, . . . , UE Z''' 166) are currently located at customer premise site N 108.

Figure 2:
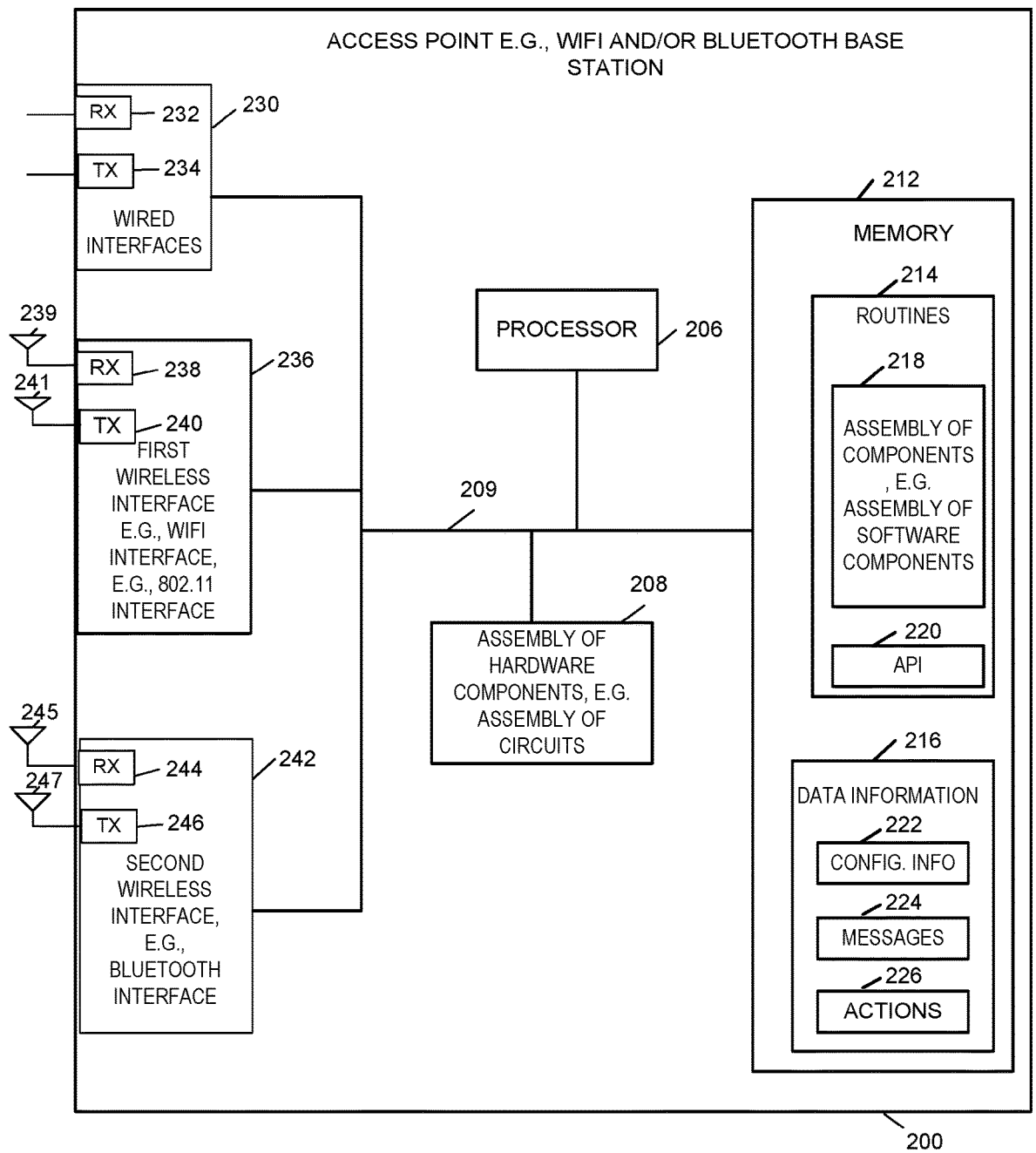
FIG. 2 is a block diagram illustrating an embodiment of wireless access point which can be used in the system shown in FIG. 1.

FIG. 2 is a drawing of an exemplary access point 200 (e.g., access points AP 1 142, . . . , APX 144, AP 1' 150, APX' 152, AP 1" 1 160, . . . , APX" 162, AP 1''' 170, . . . , APX''' 172) in accordance with an exemplary embodiment.

Access point 200 includes wired interface 230, wireless interfaces 236, 242, a processor 206, e.g., a CPU, a memory 212, and an assembly of components 208, e.g., assembly of hardware components, e.g., assembly of circuits, coupled together via a bus 209 over which the various elements may interchange data and information. Wired interface 230 includes receiver 232 and transmitter 234. The wired interface couples the access point 200 to a network and/or the Internet 134 of FIG. 1. First wireless interface 236, e.g., a wireless a Wi-Fi interface, e.g. 802.11 interface, includes receiver 238 coupled to receive antenna 239, via which the access point may receive wireless signals from communications devices, e.g., wireless terminals, and transmitter 240 coupled to transmit antenna 241 via which the access point may transmit wireless signals to communications devices, e.g., wireless terminals. Second wireless interface 242, e.g., a Bluetooth interface, includes receiver 244 coupled to receive antenna 245, via which the access point may receive wireless signals from communications devices, e.g., wireless terminals, and transmitter 246 coupled to transmit antenna 247 via which the access point may transmit wireless signals to communications devices, e.g., wireless terminals.

Memory 212 includes routines 214 and data/information 216. Routines 214 include assembly of components 218, e.g., an assembly of software components, and Application Programming Interface (API) 220. Data/information 216 includes configuration information 222, message event stream capture 224 and collection of remedial actions 226 to be taken in case of discovery of abnormal message flows.

Figure 3:
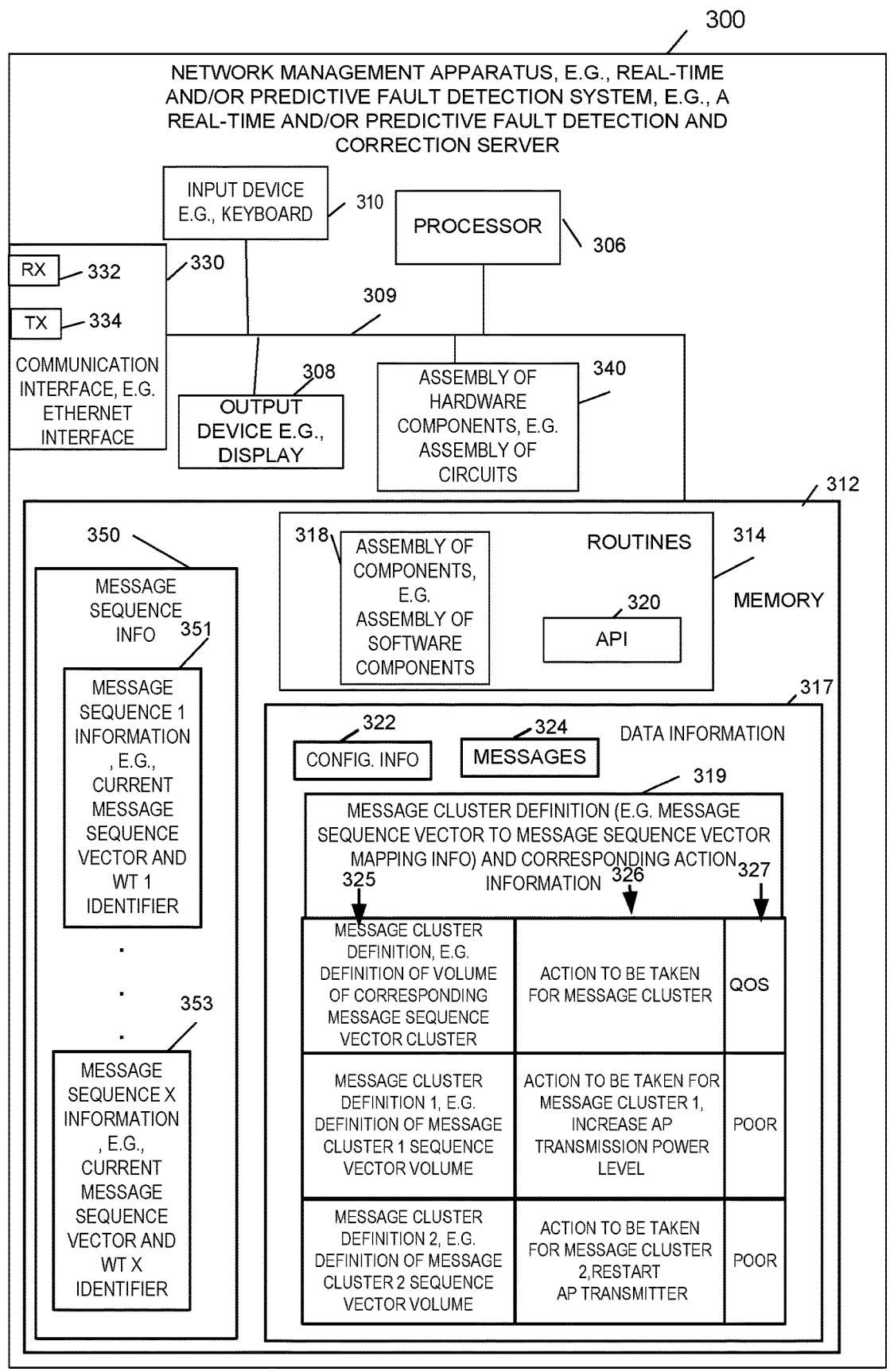
FIG. 3 is a block diagram illustrating an embodiment of network management apparatus, e.g., real-time and/or predictive fault detection and correction device that can be implemented as a standalone network device, e.g., server or incorporated into another network device, e.g., an access point of FIG. 1.

FIG. 3 is a drawing of an exemplary network management apparatus 300, e.g., a real-time and/or predictive fault detection network management node, in accordance with an exemplary embodiment. In some embodiments, the network management apparatus 300 is a network management node, e.g., a network management server such as network management real-time and/or predictive fault detection and correction server. In some embodiments, network management apparatus 300 of FIG. 3 is network management system (NMS) 136 of FIG. 1. In some embodiments the network management apparatus 300 is or is part of an access point such as any one of the access points shown in FIG. 1.

Network management apparatus 300 includes a communications interface 330, a processor 306, an output device 308, e.g., display, printer, etc., an input device 310, e.g., keyboard, keypad, touch screen, mouse, etc., a memory 312 and an assembly of components 340, e.g., assembly of hardware components, e.g., assembly of circuits, coupled together via a bus 309 over which the various elements may interchange data and information. The communications interface 330 includes an Ethernet interface in some embodiments. Communications interface 330 couples the network monitoring system 300 to a network and/or the Internet. Communications interface 330 includes a receiver 332 via which the network monitoring apparatus can receive data and information, e.g., including service related information, e.g., message streams, connection time information, and success/failure related information from access points, e.g., for radio connection establishment, AAA services, DHCP requests, Simple Notification Service (SNS) look-ups, and Web page requests, and a transmitter 334, via which the network monitoring apparatus 300 can send data and information, e.g., including configuration information and instructions, e.g., instructions to access points to restart, change transmission power, add SSID, etc.

Memory 312 includes routines 314 and data/information 317. Routines 314 include assembly of components 318, e.g., an assembly of software components, and Application Programming Interface (API) 320. Data/information 317 includes configuration information 322, captured message event stream 324 including messages and/or message fields as well as source and destination information, e.g., the WT sending or receiving a message. The memory 312 also includes message cluster related information 319 including message cluster definition information 325, action to be taken information 326 and a quality of service indicator 327 for the corresponding cluster. In information 329 the first row provides a heading while each additional row provides information for one message cluster. For example the second row corresponds to a message cluster definition for a first message cluster represented by or corresponding to a first cluster of message sequence vectors defined by a volume specified in the first element of row two of information 319. The action to be taken corresponding to when a message sequence is found to correspond to message cluster 1, e.g., increase AP transmission power level, is shown in the second column 326 of row 2 of information 319 and the third column 327 shows that cluster 1 corresponds to poor service. Row 3 of information 319 includes information for message cluster 2 including information defining a message sequence vector cluster, e.g., in terms of a N dimensional volume, corresponding to message cluster 2 and an indication that message cluster 2 also corresponds to poor service. Additional information and actions may be, and normally are, included in information 319 for other message clusters corresponding to poor service. Message cluster definition information for message clusters associated with good service may also be included in information 319 but remedial action information may be, and normally is, omitted for message clusters corresponding to good service which are included in information 319.

The remedial actions may be configured by the system administrator based on past experience. In accordance with some example embodiment, the remedial actions may be downloaded to specific APs. In accordance with other embodiments, the remedial actions are automatically invoked as soon as an abnormal message flow is detected by the messaging model 327 which may reside in memory 312 as well.

The memory 312 also includes message sequence information 350 for one or more messages sequences, e.g., communications control related message sequences, which are detected. For each detected message sequence information about the WT involved in the message sequence is included and, optionally, in some embodiments information indicating the one or more APs with which a device is communicating is also included in the message sequence information. Message sequence information 350 includes for each message sequence, in addition to information identifying the WT involved in the message sequence, a current message sequence vector value. This value will normally be updated as messages in the corresponding sequence are received with the value being compared to message cluster definition information to determine if the message sequence matches a defined message cluster as maybe indicated by the message sequence vector of the message sequence falling within the message sequence vector cluster volume used to define a message sequence cluster in the information 319. The message sequence information 350 is shown as including message sequence information (351, . . . , 353) for multiple message sequences, e.g., message sequence 1 to message sequence X.

Figure 4:
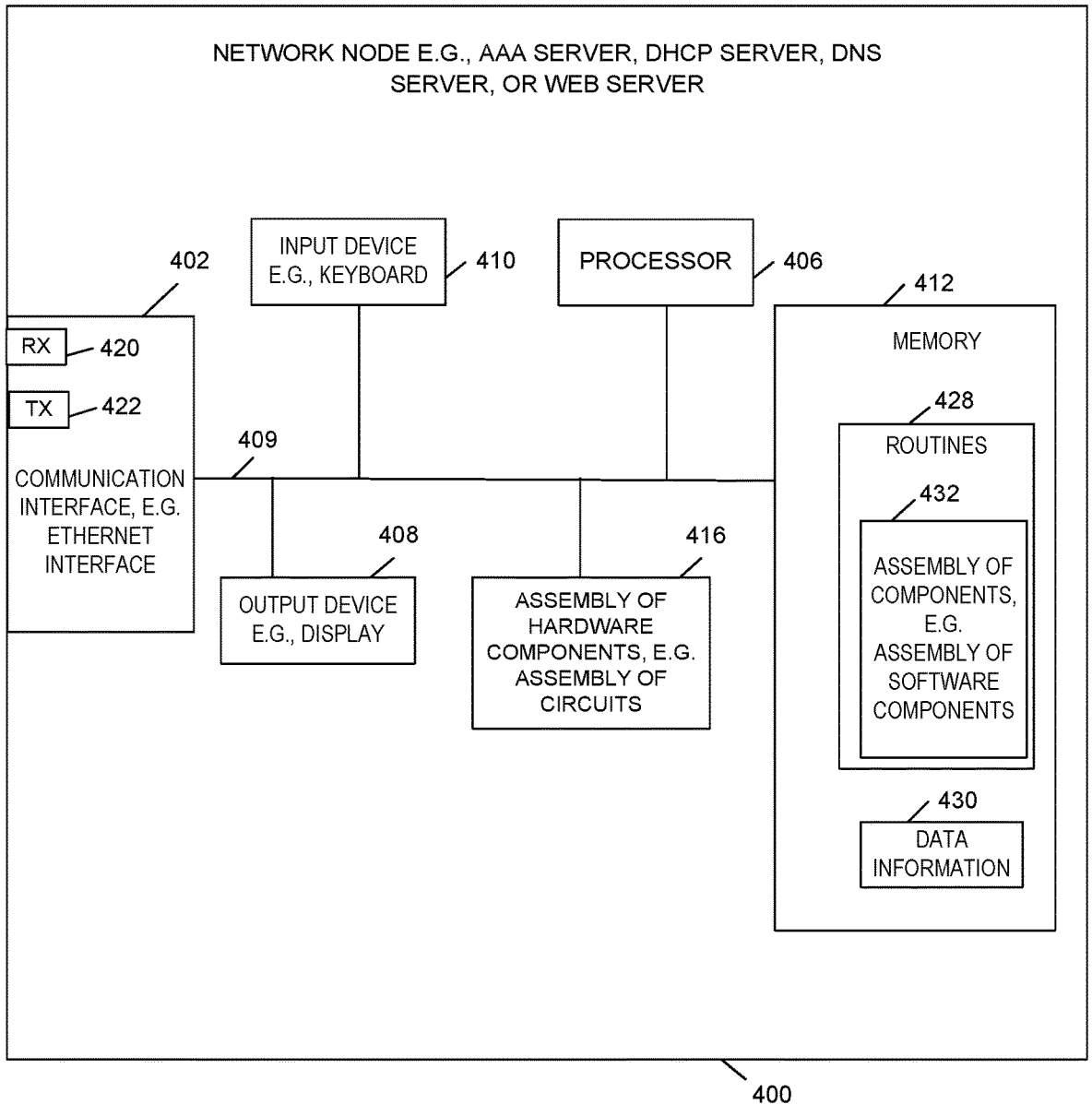
FIG. 4 is a block diagram illustrating an exemplary network node that can be used as any one of several devices shown in FIG. 1.

FIG. 4 is a drawing of an exemplary network node 400, e.g. a server, e.g., AAA server, DHCP server, DNS server, Web server, etc. In some embodiments, network node 400 of FIG. 4 is server 110, 116, 122, 128, of FIG. 1. Network node 400, e.g. a server, includes a communications interface 402, e.g., an Ethernet interface, a processor 406, an output device 408, e.g., display, printer, etc., an input device 410, e.g., keyboard, keypad, touch screen, mouse, etc., a memory 412 and an assembly of components 416, e.g., assembly of hardware module, e.g., assembly of circuits, coupled together via a bus 409 over which the various elements may interchange data and information. Communications interface 402 couples the network node 400 to a network and/or the Internet. Communications interface 402 includes a receiver 420 via which the network node 400, e.g. a server, can receive data and information, e.g., including operation related information, e.g., registration request, AAA services, DHCP requests, Simple Notification Service (SNS) look-ups, and Web page requests, and a transmitter 422, via which the network node 400, e.g., a server, can send data and information, e.g., including configuration information, authentication information, web page data, etc.

Memory 412 includes routines 428 and data/information 430. Routines 428 include assembly of components 432, e.g., an assembly of software components and data information 430.

Figure 5:
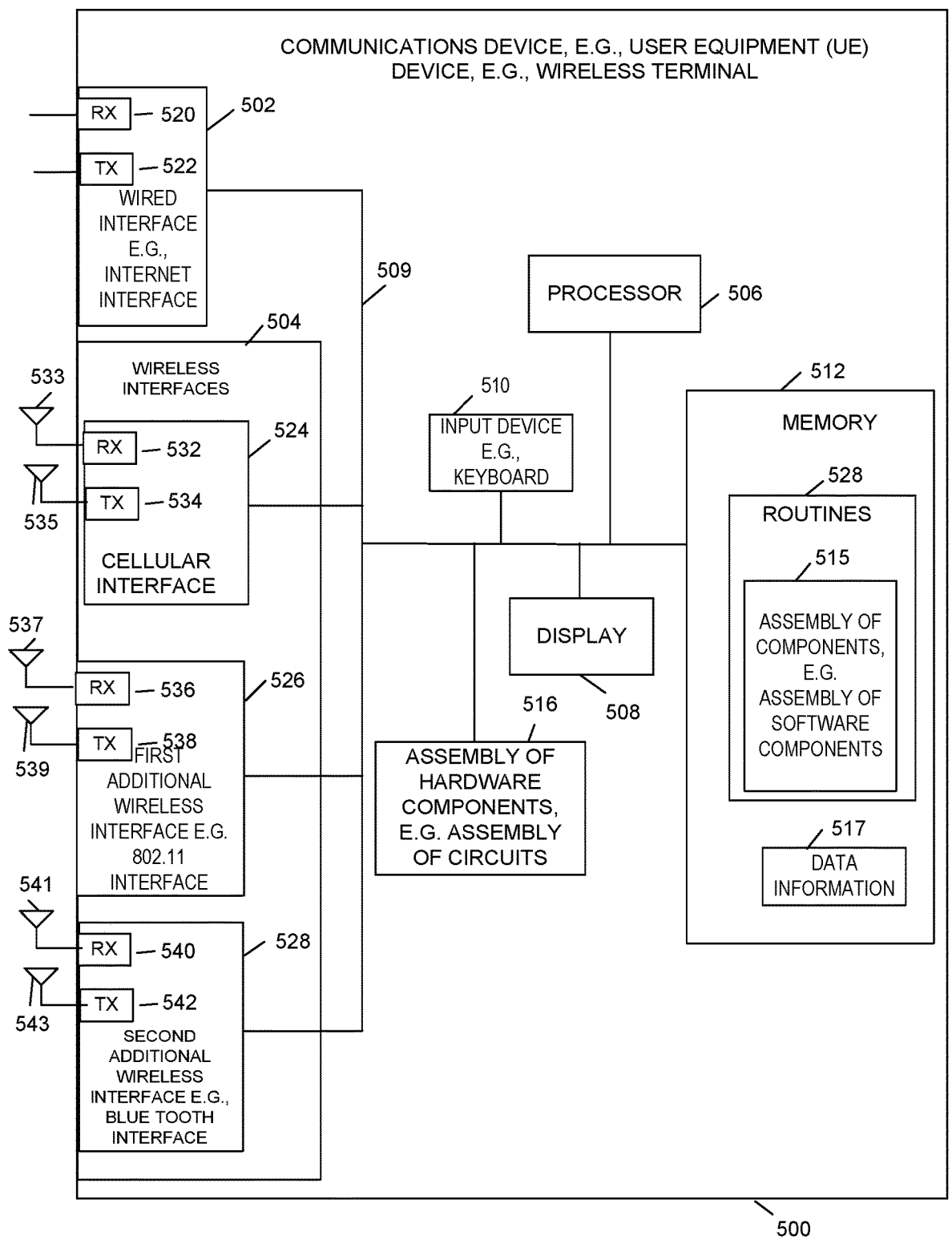
FIG. 5 is a block diagram illustrating an embodiment of an exemplary communications device such as WT which can be used as a UE in the system of FIG. 1.

FIG. 5 is a drawing of an exemplary communications device 500, e.g. a user equipment (UE) device (e.g., user equipment UE 1 138, . . . , UE Z 140, UE 1' 146, . . . , UE Z' 148, UE 1" 154, . . . , UE Z" 156, UE 1'" 164, . . . , UE Z'" 166) in accordance with an exemplary embodiment. Communications device 500, e.g., a UE, includes wired interfaces 502, wireless interfaces 504, a processor 506, e.g., a CPU, a memory 512, and an assembly of components 516, e.g., assembly of hardware module, e.g., assembly of circuits, coupled together via a bus 509 over which the various elements may interchange data and information. Wired interface 502 includes receiver 520 and transmitter 522. The wired interface 502 couples the communications device 500, e.g. a UE, to a network and/or the Internet 134 of FIG. 1.

The wireless interface 504 includes cellular interface 524, first additional wireless interface 526, e.g., 802.11 WiFi interface, and a second additional wireless interface 528, e.g., Bluetooth interface. The cellular interface 524 includes a receiver 532 coupled to receiver antenna 533 via which the communications device 500, e.g. UE, may receive wireless signals from access points, e.g., AP 1 142, . . . , APX 144, AP 1' 150, APX' 152, AP 1" 1 160, . . . , APX" 162, AP 1'" 170, . . . , APX'" 172, and transmitter 534 coupled to transmit antenna 535 via which the communications device 500, e.g. UE, may transmit wireless signals to APs, e.g., AP 1 142, . . . , APX 144, AP 1' 150, APX' 152, AP 1" 1 160, . . . , APX" 162, AP 1'" 170, . . . , APX'" 172. First additional wireless interface 526, e.g., a Wi-Fi interface, e.g. 802.11 interface, includes receiver 536 coupled to receive antenna 537, via which the communications device 500, e.g., UE, may receive wireless signals from communications devices, e.g., APs, and transmitter 538 coupled to transmit antenna 539 via which the communications device 500, e.g., UE, may transmit wireless signals to communications devices, e.g., APs. Second additional wireless interface 528, e.g., a Bluetooth interface, includes receiver 540 coupled to receive antenna 541, via which the communications device 500, e.g. a UE, may receive wireless signals from communications devices, e.g., APs, and transmitter 542 coupled to transmit antenna 543 via which the communications device 500, e.g., a UE, may transmit wireless signals to communications devices, e.g., APs.

Memory 512 includes routines 528 and data/information 517. Routines 528 include assembly of components 515, e.g., an assembly of software components. Data/information 517 may include configuration information as well as any additional information required for normal operations of UE 500.

FIG. 6A is a drawing of an exemplary message dictionary 600 which is implemented as a table in accordance with an exemplary embodiment. Exemplary message dictionary 600 includes index 610 which includes an index number for each message listed in a row of column 620. The table includes 22 messages but the number of message can be much larger with the number of messages depending on the number of messages included in a training database and/or the number of unique message which are likely to be communicated to/from, e.g., between a WT and one or more APs in the system in which the method is used. Thus the dictionary 600 will include the possible messages which can pass over an interface between an access point AP and a wireless terminal, e.g. a communications device such as a user equipment (UE) device. Column 620 provides the names of the individual indexed messages. The name may include, and often does, the message type and, in the case of a failure message, optionally a reason code, e.g., indicating a reason for the failure indicated by the message. Column 630 of the dictionary 600 provides comments that explain the message in the row to which the comment corresponds and is included to facilitate user understanding of the messages but can be omitted from the memory of a device implementing the method if desired to save data. As can be seen from FIG. 6A, with regard to some messages such as "DHCP POOL EXHAUSTED" the comment field may be blank, as the name of the message provides sufficient information to understand the meaning of the message. Message fields such as the ID of the wireless client, the IP address of the wireless client, and the IP address of the AP may be, and often are, omitted from the dictionary.

Figure 6B:
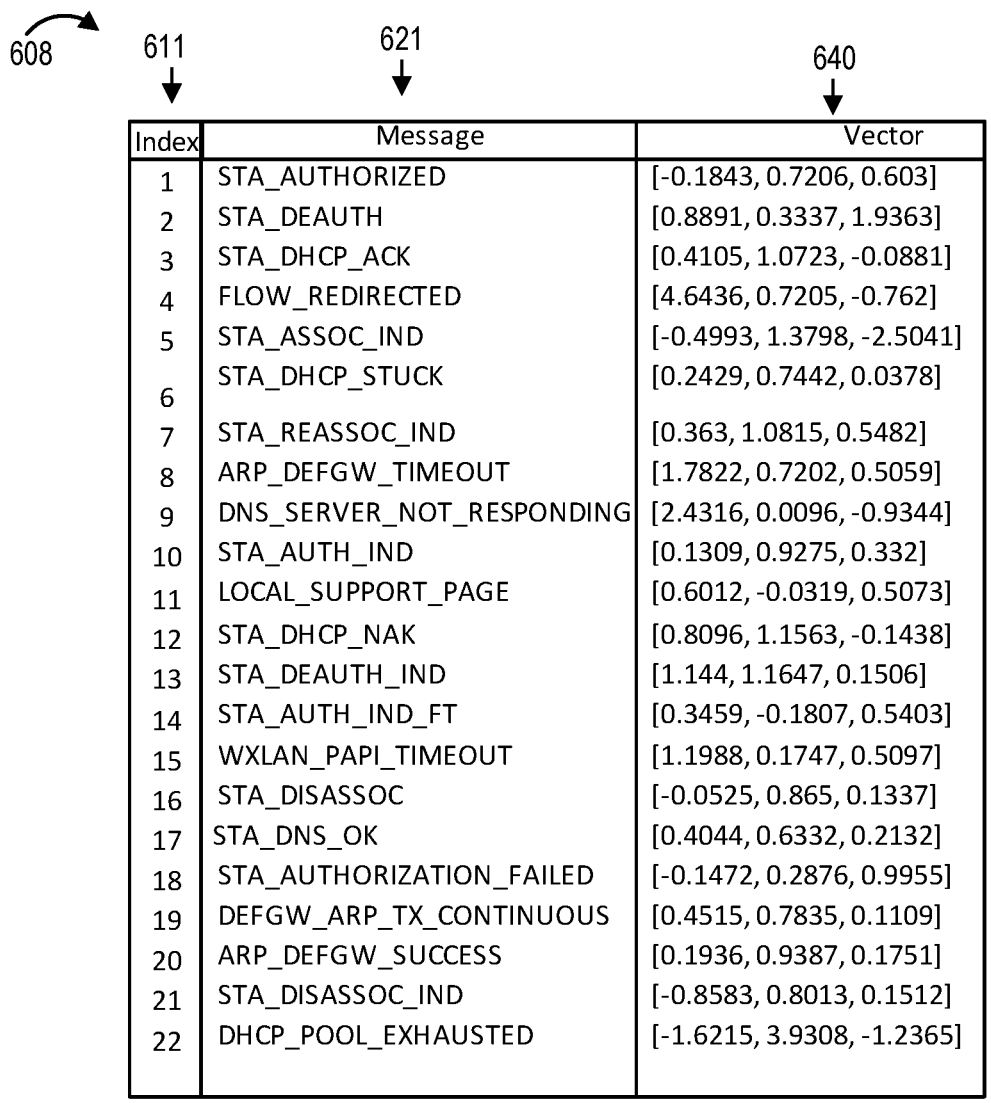
FIG. 6B shows a set of information in the form of messages and corresponding exemplary 3 dimensional message vectors stored used in an exemplary embodiment.

FIG. 6B shows a set of information in table 608, which is similar to the message dictionary 600 of FIG. 6A. Table 608 of FIG. 6B includes an index column 611, a message column 621 and message vector column 640. Each row of the table 608 corresponds to a different message. A three dimensional message vector corresponding to the row of a message provides the message vector corresponding to the message in the row. For example the message STA_AUTHORIZED is indexed as the first message in the table 608 and is identified by index 1 and has a corresponding message vector [−0.1843, 07206, 0.603]. While in the example the number of dimensions N of the exemplary message vector is 3, with the message vector thus including three distinct elements with corresponding values, in some implementations message vectors with a larger number of dimensions is used with message vector sizes of between 10 and 20 dimensions being common. Larger vector sizes can also be used. Each value corresponding to a different dimension depends on or more features associated with the message to which the vector corresponds. For example the message vector value [−0.1843] corresponding to the first dimension may depend on the how frequently the message appears in the training set of data, the message vector value [0.7206] corresponding to the second dimension may depend on how far in terms of messages, the message normally appears from the beginning of a message sequence; and the message vector value [0.603] corresponding to the third dimension may depend on the average overall length in terms of messages, a message sequence is that includes the message to which the vector corresponds. It should be appreciated that other features or combinations of feature associated with a message and/or the message sequence in which the message is normally found can be used to generate the values for individual elements or dimensions of the message vector and that the discussed features are only exemplary.

Column 640 of FIG. 6B could be included as a column in the message dictionary 600 of FIG. 6A but is shown separately since during use table 608 can be used to determine the message vector corresponding to a detected message without the need to consult dictionary 600 which also includes human understandable comments.

Figure 7:
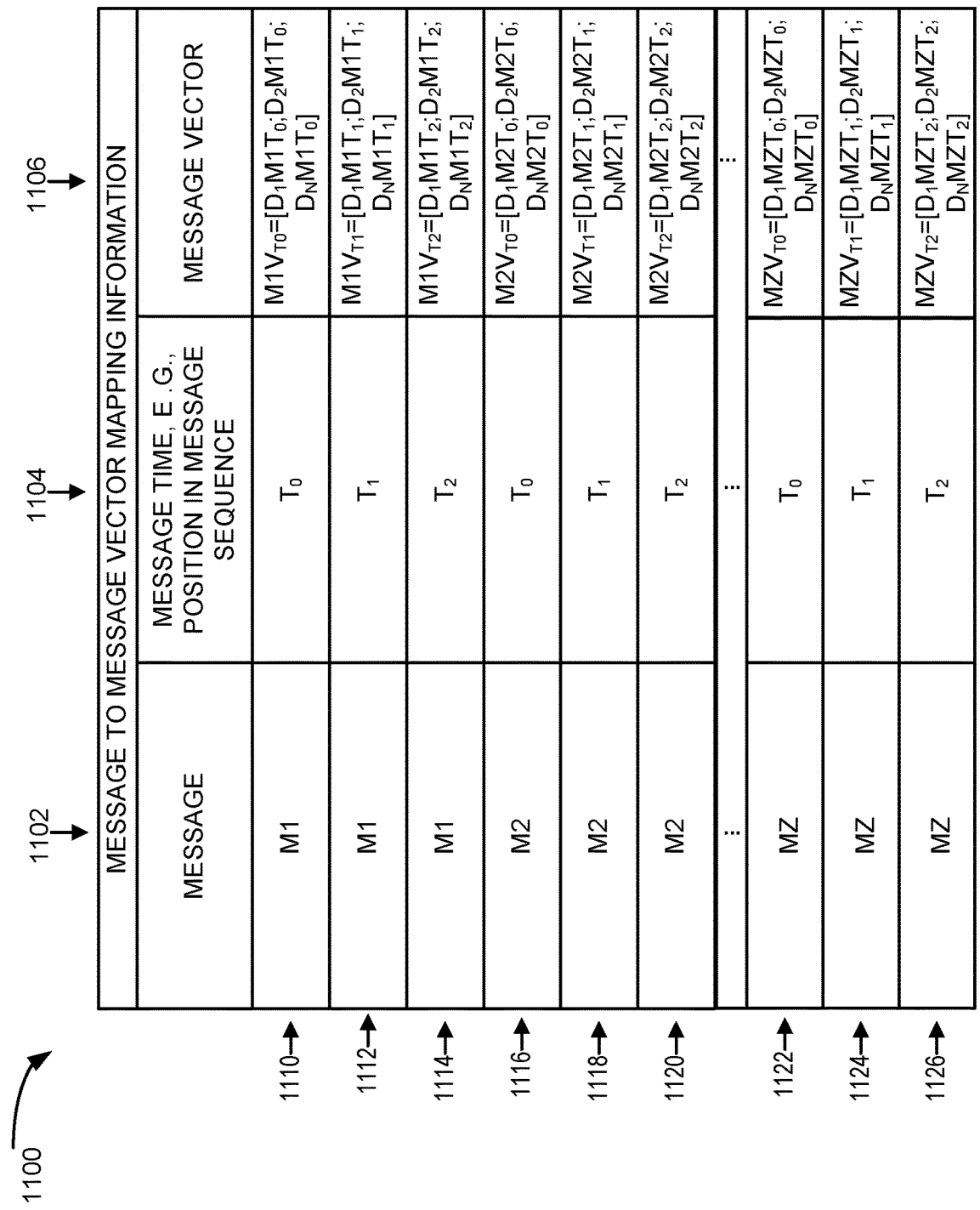
FIG. 7 illustrates an exemplary set of message to message vector mapping information that can be stored and used in the system of FIG. 1.

In some embodiments for message vector determination purposes, the position where a message occurs in a message sequence is taken into consideration with the position of the message in the sequence in combination with the message determining the message vector corresponding to a message. FIG. 7 shows an embodiment of an exemplary table 1100 which maps messages in combination with message position in a sequence to a message vector including a plurality of message vector values with each value corresponding to one of N dimension of the message vector.

In the set of information shown in table 1100 of FIG. 7, each of the first through last rows 1110, 1112, 1114, 1116, 1118, 1120, . . . , 1122, 1124, 1126 correspond to a different combination of message and message position in a message sequence. The first column 1102 lists the message, the second column 1104 lists the position of the message in a sequence where it is detected and the last column 1106 lists the corresponding message vector, e.g., the N message vector values one per each of the N dimensions of the vector, for the message and detection position to which the message in the row corresponds. While T or the phrase message time is used in the FIG. 7 example, it should be understood that this is not an absolute time but refers to the position in a message sequence to which the detected message corresponds. For example if message M1 is detected as the first message in a sequence it would correspond to time T0 and if it is the second message in the sequence it would correspond to time T1 and if it was the third message it would correspond to T2.

Consider for example that message row 1110 corresponds to message M1 as indicated by the content of column 1102 row 1110. For consistency with the FIG. 6B example consider message M1 to be the STA_AUTHORIZED message. From column 1104, of row 1110 it can be seen that the first row corresponds to the case where M1 is detected in the first, e.g., T0 time slot, of a message sequence. In such a case the message vector for M1 when it is detected in the T0 time slot can be obtained from column 1106, row 1110 with the message vector value M1VT0 in a 3 dimensional vector embodiment include the value D1M1T0 for the first dimension value, D2M1T0 for the second dimension value and DNM1T0 for the third dimension value which is identified using an N since in the example N=3 since the vectors are 3 dimensional vectors. D is used to indicate a dimensional value since V is used to indicate a vector.

Message row 1112 corresponds to message M1, time slot T1, and message vector M1VT1. Message row 1114 corresponds to message M1, time slot T2, and message vector M1VT2. Message row 1116 corresponds to message M2, time slot T0, and message vector M2VT0. Message row 1118 corresponds to message M2, time slot T1, and message vector M2VT1. Message row 1120 corresponds to message M2, time slot T2, and message vector M2VT2. Message row 1122 corresponds to message MZ, time slot T0, and message vector MZVT0. Message row 1124 corresponds to message MZ, time slot T1, and message vector MZVT1. Message row 1126 corresponds to message MZ, time slot T2, and message vector MZVT2.

While three time positions are shown in the example of FIG. 7, it should be appreciated that message sequences can be many message long and thus a practicable message to message vector mapping information would include entries for more than 3 positions. While a table such as the one shown in FIG. 7 may include a large number of entries, the amount of data in each entry is relatively small still making it easy to store and use. While an index column is not included in the FIG. 7 example, an index column for each row of the table may be included as in the example shown in FIG. 6B to facilitate table access.

The information tables shown in FIGS. 6B and 7 can be generated during a training phase based on message sequences collected over a period of time. During use the tables shown in FIGS. 6B and 7 can be static, but in some embodiments they are updated at various points in time based on message sequences collected during use of the tables to determine if a detected message sequence corresponds to a poor service experience as indicated by the message sequence being matched to a message sequenced vector cluster with which poor service is associated.

It should be appreciated that while the FIG. 6B and FIG. 7 examples map each message to a vector of three dimensions, this is done for illustration proposes and that vectors of other larger sizes will often be used. As indicated above practical system may use much higher dimensionality for the vector such as vectors of 15 to 30 dimensions.

Figure 8:
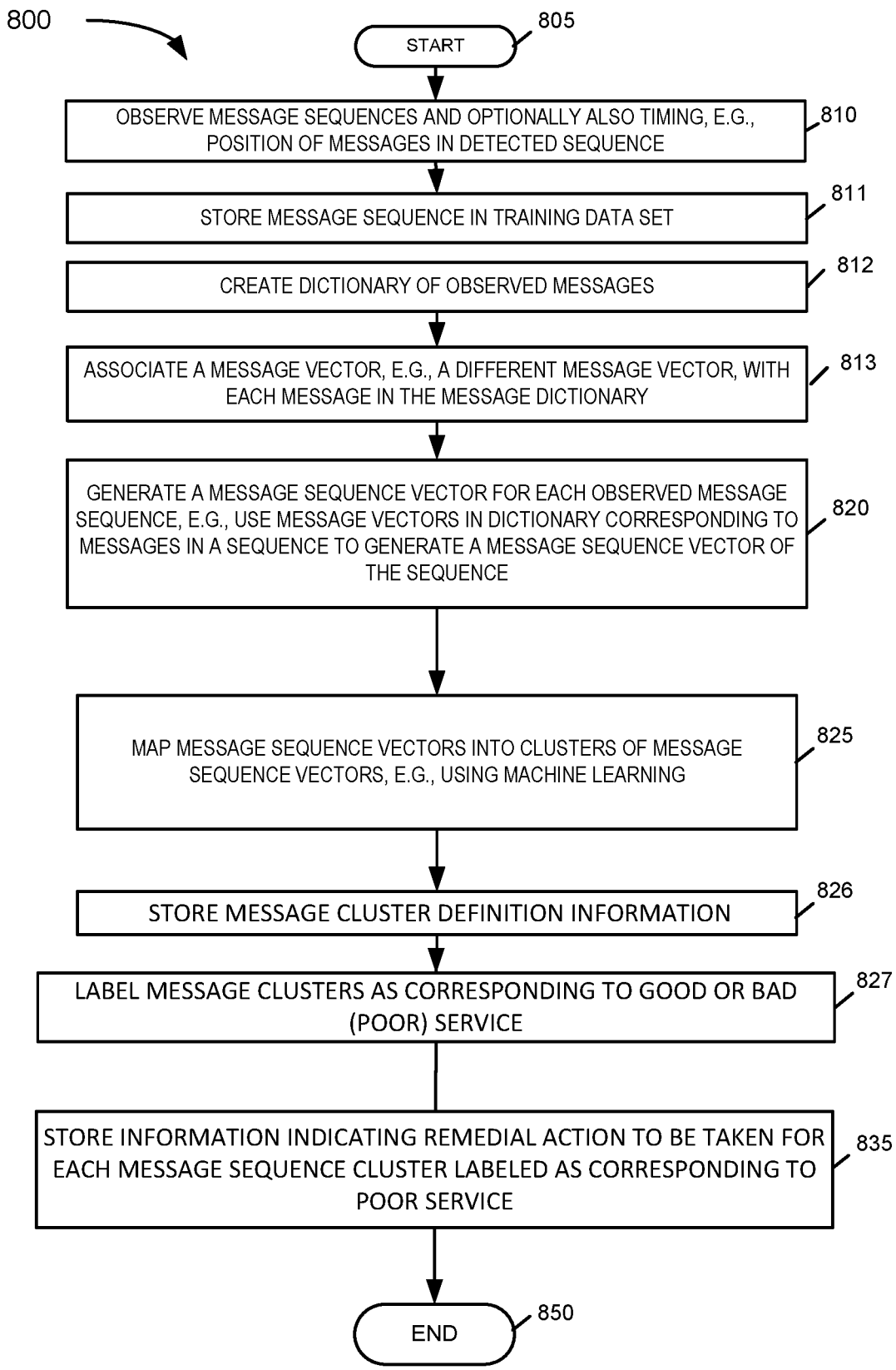
FIG. 8 is a flowchart illustrating a training and information storage process which can be used in the system of FIG. 1 to store information that can be used to determine if a detected message sequence corresponds to a message sequence cluster and remedial actions to be taken when a message sequence is determined to correspond to a message sequence cluster corresponding to poor service.

FIG. 8 illustrates a flowchart showing the steps 800 of a training and information storage process which can be used in the system of FIG. 1 to store information that can be used to determine if a detected message sequence corresponds to a message sequence cluster and what if any remedial actions should be taken when a message sequence is determined to correspond to a message sequence cluster corresponding to poor service, e.g., a service level metric below a predetermined level used to indicate satisfactory service.

The method 800 includes various exemplary steps which may be used in some, but not all embodiments, as part of the process of creating and updating a message dictionary and storing a set of information for later use.

The method starts in start step 805 when it is implemented by a device, e.g., such as the network management system 136 which receives detected messages communicated between a WT and APs in the system shown in FIG. 1. Operation proceeds from start step 805 to step 810 in which message sequences and also timing are observed. The timing may, and in some embodiments does, correspond to the position of a message in a message sequence to which the message corresponds. The observations made in step 810 can be performed by an AP and communicated to the system 136 implementing the method 800 or the observations can be made monitoring a stream of messages by one or more APs, extracting fields of interest from the observed messages and sending them to the network management system 136 for observation and/or use in generating a training database of message sequences.

Operation proceeds from step 810 to step 811 where the observed message sequences are stored in a data set to be used for training purpose. Then in step 812 the network management system 136 creates a dictionary of observed messages with at least one entry for each observed message between a WT and an AP. In the case where message timing is considered, the dictionary can include one entry for each time position at which a particular message is detected. In some but not all message embodiments timing delay between messages is considered and the dictionary includes different entries for each message and associated delay from a previous message in a sequence. The dictionary can be the same or similar to the dictionary 600 shown in FIG. 6A or the message lists shown as the first two columns of FIGS. 6B and 7.

With messages in the set of training data having been identified, along with timing information in some embodiments, the method proceeds to message vector generation step 813. In step 813 a message vector is generated for each message or message/timing combination included in the dictionary that was generated in step 812. The generated message vector includes N dimensions where the individual element corresponding a dimension is generated based on one or more features relating to the message to which the generated vector corresponds such as the frequency of the specific message, the position in which the message appears in message sequences, the timing between the said message and the preceding message, etc. As noted above vectors may include a large number of dimensions e.g. 10 to 30 depending on the embodiment. The message vectors may be and sometimes are stored in memory as part of a table which includes the message dictionary information. The stored table may be, and sometimes is, the same or similar to the tables shown in FIGS. 6B and 7.

With message vectors having been generated for the messages in the training set of data which are included in the generated dictionary, operation proceeds to step 820 in which message sequence vectors for individual message sequences in the training set of data are generated in step 820. Message sequences are between a WT and an AP with different WT and AP combinations corresponding to different message sequences.

As noted above the APs monitor and report messages to facilitate training. In some embodiments prior to training the system monitors message exchanges between the user equipment (WTs) and one or more APs. Assuming that the monitoring happens during a long time, messages corresponding to a large number of different sequences may be collected, for example, 1,000,000 messages may be collected over several days or week to be used for training purposes. The beginning of a message sequence and how many of the following messages belong to a particular individual sequence of messages can be determined automatically or by a human labeling the message sequences to facilitate training. The identification of message sequences, their beginning and their end can be done manually, wherein a technical person identifies the sequences. Another automated approach is used in some embodiments to identify messages that are used at the beginning of an exchange of messages between the AP and a user equipment device (WT), and these messages are then used to automatically identify the start of an individual message sequence included in the training data taking into consideration not only the message but also the WT and AP involved in the message exchange.

For the processing of the sequence of messages, the individual sequences should be viewed as different client sessions. The beginning of each session starts with one specific type of message, e.g., a STA_ASSOC_IND in some embodiments, which indicates that a client is initiating a communication. In addition, each successful session is determined to end with the message between the WT and one or more APs right before the next STA_ASSOC_IND sent from the WT to the AP.

Here is an example where message exchanges between a WT and one or more APs is broken down into different message sequences, e.g., corresponding to different communications sessions:

Session 1:
[STA_ASSOC_IND, STA_DEAUTH, STA_AUTHORIZATION_FAILED],

Session 2:
[STA_ASSOC_IND, STA_DEAUTH, STA_AUTHORIZED, STA_AUTHORIZATION_FAILED, STA_DHCP_ACK, STA_DNS_OK, ARP_DEFGW_SUCCESS, STA_AUTHORIZATION_FAILED, STA_DEAUTH, STA_DEAUTH], Session 3:
[STA_ASSOC_IND, STA_AUTHORIZATION_FAILED, STA_DEAUTH, STA_DISASSOC, STA_DEAUTH, STA_AUTHORIZATION_FAILED], Session 3:
[STA_ASSOC_IND, STA_DEAUTH, STA_AUTHORIZATION_FAILED], Session 4:
[STA_ASSOC_IND, STA_DEAUTH, STA_AUTHORIZED, STA_AUTHORIZATION_FAILED, STA_DHCP_ACK, STA_DNS_OK, ARP_DEFGW_SUCCESS, STA_AUTHORIZATION_FAILED, STA_DEAUTH, STA_DEAUTH], Session 5:
[STA_ASSOC_IND, STA_AUTHORIZATION_FAILED, STA_DEAUTH, STA_DISASSOC, STA_DEAUTH, STA_AUTHORIZATION_FAILED]

To understand the generation of the message sequence vector in step 820, it should be appreciated that the messages for each identified message sequence are processed in the order they occur in the sequence to generate a message sequence vector for the messages of an individual message sequence.

Figure 11:
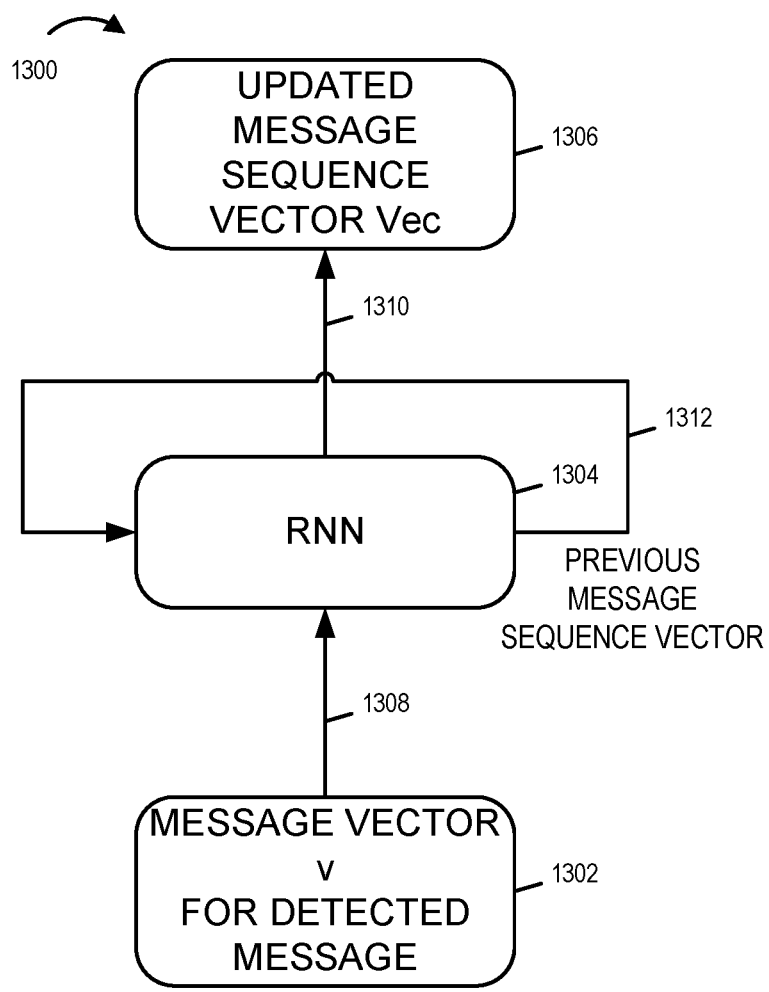
FIG. 11 shows a process wherein a message vector for a detected message is used to updated a current message sequence vector corresponding to the message sequence to which the detected message corresponds to generate an updated message sequence vector.

Let's look at a machine learning (ML) model that can be used to generate the message sequence vector by refereeing to FIG. 11 which shows method 1300 for generating a message sequence vector for a sequence with the message sequence vector being updated, sequentially, based on the individual detected messages of a message sequence. The ML model is able to start with an initial default message vector state and update and preserve the state of system as new observations, e.g., messages in the sequence, are processed. A very good example of such an approach uses a recursive neural network (RNN) 1304 as shown in FIG. 11. The input to the RNN 1304 is the vector v 1302 of a message in the sequence and the output is Vec 1306, an updated message sequence vector. The ML model generates an updated message sequence vector 1306 as each message is fed to the RNN 1304 model with the last output, e.g., previous message sequence vector serving as an additional input to the computation of the updated message sequence vector as indicated by feedback arrow 1312 which indicates use of the last output as an input to the RNN 1304. In accordance with yet another embodiment, the feedback arrow 1312 illustrates an internal state vector which is fed back into the RNN 1304 model. With the last message of a sequence being processed, the updated message sequence vector which is generated is the message sequence vector for the sequence which is generated in step 820 and used as input to step 825. In various embodiments the message sequence vector for the message sequence will include the same number of dimensions and thus the same number of fields and corresponding values as the message vectors used to generate the message sequence vector. Thus in some embodiments when N dimensional message vectors are used, the message sequence vector will also include N dimensions.

Figure 12:
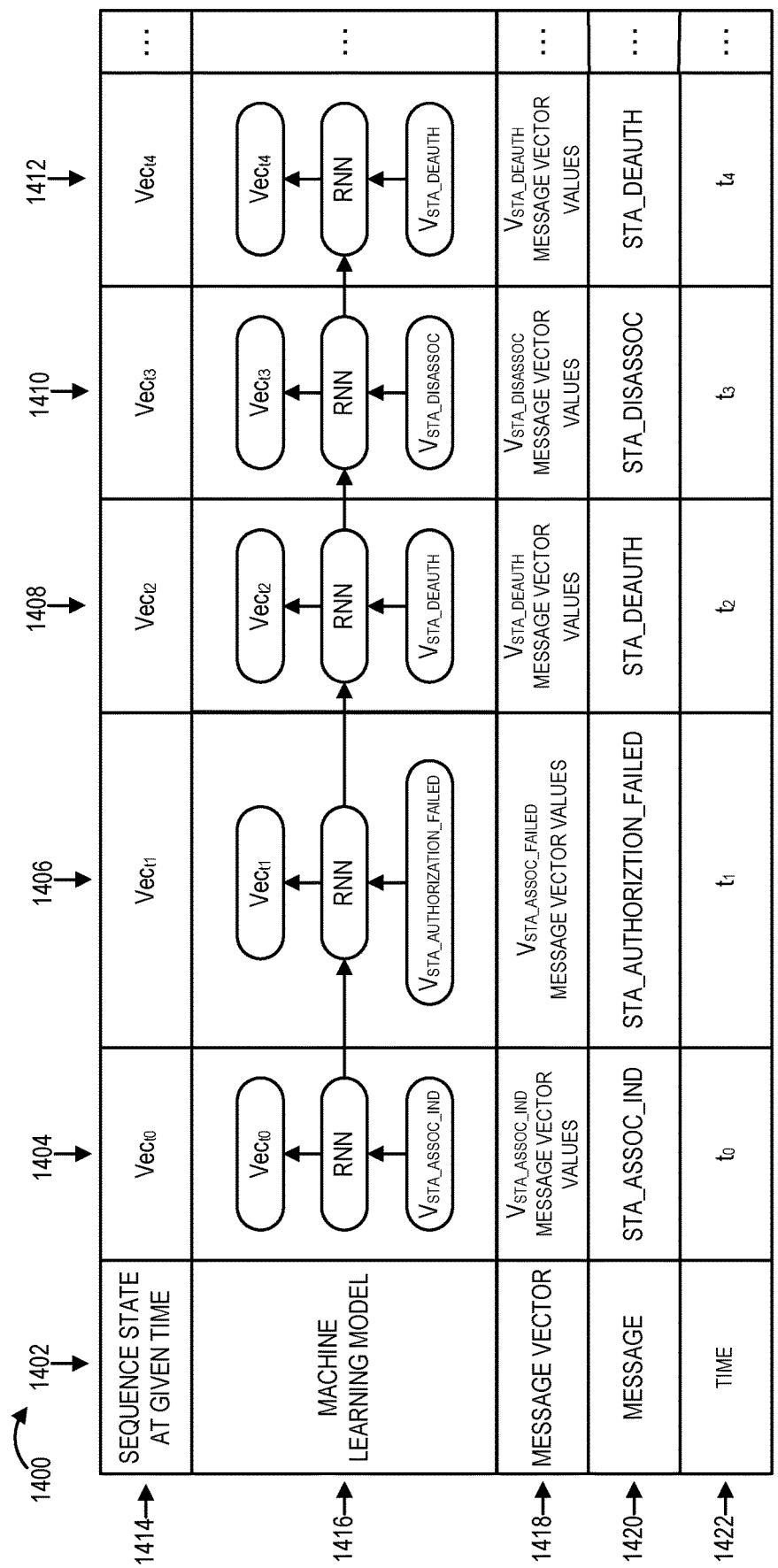
FIG. 12 illustrates how messages of a sequence can be processed to generate message sequence vectors for each of a plurality of sequential time periods where each time period corresponds to detection of a message corresponding to the sequence to which the message sequence vector corresponds.

The sequential processing of a sequence of messages corresponding of an individual message sequence to generate a message sequence vector can be understood with reference to FIG. 12 which is a diagram 1400 showing the processing of messages in a message sequence. Row 1414 and column 1402 provide column and row labels to facilitate understanding of the information shown in each column and row. For example row 1414 shows the sequence state at a given time, in the form of a message sequence vector Vec which is the updated message sequence vector for the indicated message time t0, t1, t2, t3 or t4.

Row 1416 shows the machine model used at a given time including the inputs and output of the RNN. Row 1418 shows the message vector in the sequence corresponding to the message shown in row 1420 which is the message in the detected sequence at the time, e.g., message position in the sequence, shown in row 1422.

Each of the columns 1404, 1406, 1408, 1410, 1412 corresponds to processing of one message in the message sequence with the messages being processed in the order in which they occur. Thus FIG. 12 shows the processing of message corresponding to 5 sequential message times but with the . . . indicating that the processing can continue if the message sequence include additional messages. The message sequence vector generated from the last message in the message sequence will be used as the message sequence vector for the message sequence.

In response to detecting the message STA_ASSOC_IND at time t0, we generate the initial vector using the corresponding vector, VSTA_ASSOC_IND as an input to the RNN which has the previous state set to an initial default which may be, and sometimes is, all zeros for each of the N elements of the message sequence vector. The RNN then generates the corresponding sequence state, Vect0. Upon observing the next message, STA_AUTHORIZATION_FAILED, at time t1, we feed the corresponding message vector, VSTA_AUTHORIZATION_FAILED, into the RNN, which in turn generates the state vector Vect1. During training the process continues until the full set of message in the message sequence is processed. For example if the message sequence only included 5 messages and ended with the STA_DEAUTH message sequence vector Vect4 would be the message sequence vectors for the message sequence shown being processed in FIG. 12.

It should be appreciated that during the training phase complete message sequences are available for processing. However, during use, the message vectors for a message sequence are generated and updated as individual messages are observed, e.g., in real time, without having to wait for the complete message sequence to be received before trying to determine, based on a message sequence vector, whether or not the message sequence vector corresponds to a message sequence vector cluster with which poor service is associated and corrective action is also associated.

From the above it should be appreciated that the start of message sequences may be, and sometimes are, indicated by the use of a message which is used at the start of each message sequence, such as a "STA_ASSOC_IND" message. The end of a message sequence corresponding to a particular WT and AP pair can be detected by a failure message, a success message or detection of another message, e.g., a new STA_ASSOC_IND message sent from a WT to an AP for which an ongoing message sequence had been detected.

The message sequence vector can be, and sometimes is, set to an initial starting value in response to the start of the message sequence being detected, e.g., a STA_ASSOC_IND message being detected. Additional messages in the message sequence are used to update the message sequence vector for the message sequence being processed until the full set of messages in the training data base for the detected message sequence have been processed and used to update the message sequence vector and thereby procure the final message sequence vector for a message sequence.

Referring once again to FIG. 8, with the message sequence vectors for the message sequences in the training set of data having been generated and stored in step 820, operation proceeds from step 820 to step 825 in which the determined message sequence vectors are processed, e.g., mapped, into clusters. Any of a variety of clustering techniques, such as those used for machine learning, can be used to map the message sequence vectors into clusters in step 825. The result of the clustering in step 825 is a plurality of message cluster definitions which are stored in step 826. The message cluster definitions can and sometimes do include an individual value for each of the N elements of a message sequence vector and a range indicating the permitted deviation from the elements values that can occur with a message still belonging to the cluster. The value for an element included in a message cluster definition may be a median or average value, depending on the embodiment, for the elements of messages found to correspond to the individual cluster. For example an N dimensional cluster may include N dimension elements in the form of values and a corresponding N ranges. Other N dimensional descriptions of the volume of each message vector cluster may be used as an alternative way of defining a cluster.

With the message clusters having been identified and defined, operation proceeds to step 827 wherein the individual defined message clusters are labeled as corresponding to good or bad service. This may be done automatically, based on service level metrics for communication sessions corresponding to the message sequences in the cluster being below a predefined level used to identify poor service of the remaining message sequence clusters which are not deemed to correspond to poor service level can be deemed to correspond to good service level clusters. While the labeling of message sequence clusters can, and sometimes is, performed automatically, in some embodiments message sequence clusters are manually labeled by a system administrator as corresponding to good or poor service.

For message sequence clusters corresponding to poor service, the poor service in an individual cluster is likely to be due to the same or similar network faults or problems. The network administrator can, and sometimes does, indicate remedial action to be associated with a cluster of message sequence vectors with which poor service is associated.

In step 835 information indicating remedial action to be taken for each message sequence vector cluster labeled as corresponding to poor service is stored in association with the message sequence cluster definition and the poor service indication for the message sequence vector cluster.

Thus by the end of the training in stop step 850 a set of information will have been generated and stored which allows for message sequences to be processed in real time, checked to determine if a message sequence corresponds to a message sequence vector cluster for which a remedial action is to be taken. By taking the remedial action in real time poor service can be ameliorated or avoided without a user of a WT having to report a service problem.

Figure 9:
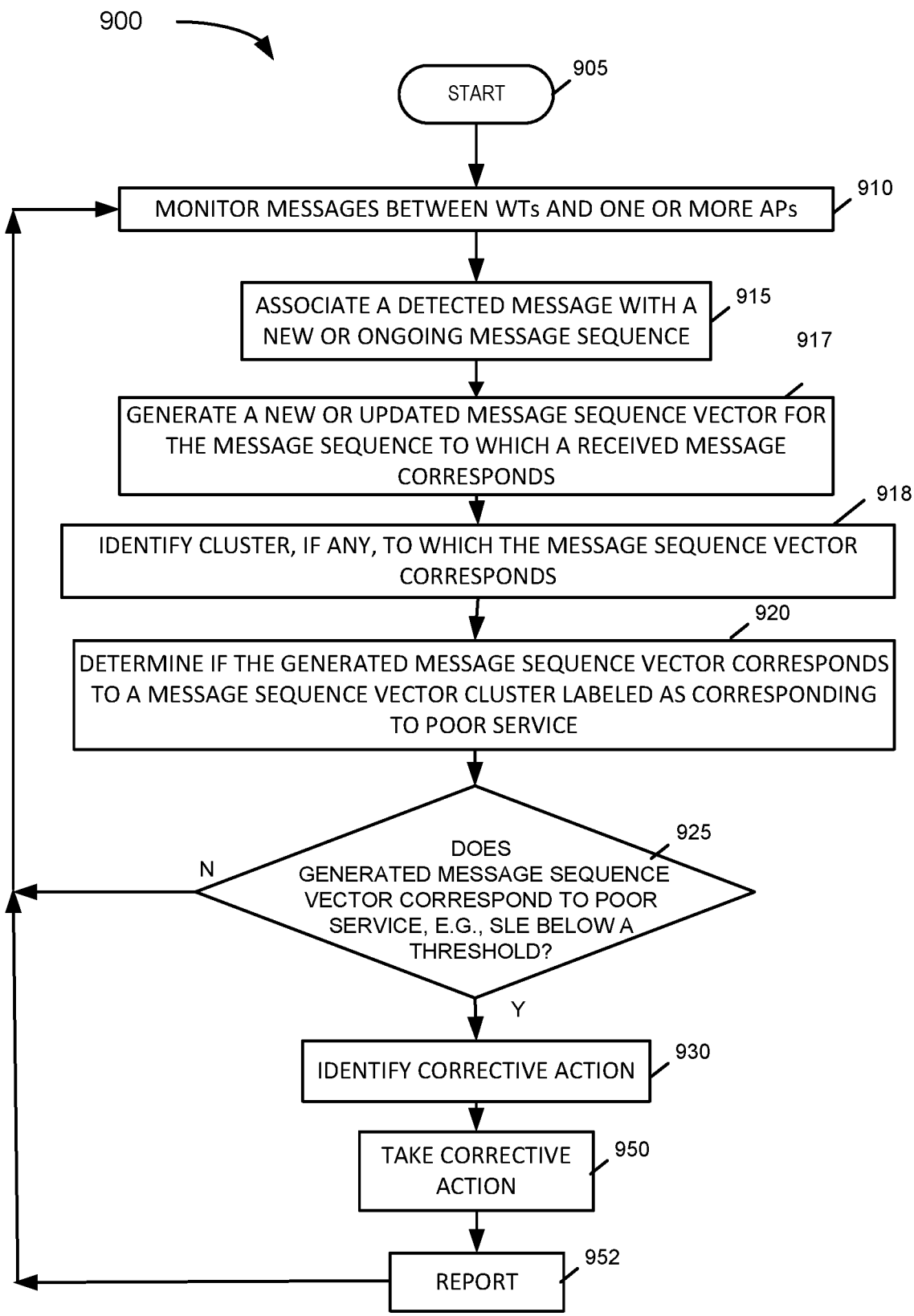
FIG. 9 illustrates a method which can be used in the system of FIG. 1 to detect message sequences, between WTs and APs, corresponding to message sequence clusters known to correspond to poor service levels and corrective actions to reduce the likelihood of poor service.

FIG. 9 illustrates a method which can be used in the system of FIG. 1 to detect message sequences, between WTs and APs, corresponding to message sequence clusters known to correspond to poor service levels and corrective actions to reduce the likelihood of poor service. The method shown in FIG. 9 is implemented by the network management system 136 after the initial training discussed with regard to FIG. 8 has been completed. The method of FIG. 9 can be implemented and used while communications of messages sequences is ongoing to detect and correct, e.g., in real time while communications of a message sequence is ongoing, faults or problems which can cause poor communications service to be encountered by a WT using an AP to communicate with another device in the network.

The method shown in the flowchart 900 begins with start step 905 which corresponds to the processor of the network management system beginning to execute instructions, e.g., of a real time monitoring and network management routine executed by the processor 306 of the network management system 300 which can be, and sometimes is, used as the network management system 136 of the system shown in FIG. 1.

Operation proceeds from start step 905 to monitoring/observation step 910 in which the network management system monitors, e.g., observes, message corresponding to message sequences and optionally also timing of messages. In step 910 the time a message is received or transmitted at an AP can be documented thereby allowing the order and/or timing between consecutive messages in a sequence to be determined from the timing information once a message is mapped, e.g., identified as corresponding to, a particular message sequence. In at least some embodiments, as previously discussed, individual message sequences correspond to messages between an individual WT and one or more APs which are being used by the WT to obtain network access and/or to communicate with another device. It should be appreciated that while a WT may start a communications control related message sequence with one AP before starting another such sequence it may communicate with multiple APs and thus one sequence may include messages sent to/from a WT to one or more APs. The observation may be, and sometimes is, implemented by observing messages sent to the monitoring system by APs communicating with WTs. In embodiments where the network management system is implemented as part of an AP, the system can monitor messages sent to/from the AP as they are being communicated.

Detection of a message in monitoring step 910, which is performed on an ongoing basis, causes operation to proceed with respect to an individual detected message from step 910 to step 915. In step 915 the message detected by the monitoring performed in step 910, is associated with a new or ongoing message sequence. In step 915 if the detected message is a message which is used to start a new message sequence, information is stored indicating the AP/WT pair to which the message corresponds and optionally the time at which the message was observed, e.g., detected by the AP sending or receiving the message. The information for each message sequence is stored and updated when an additional message corresponding to the same message sequence is detected. Matching of messages to message sequences can be performed by comparing pair of devices WT/AP to the WT/AP pairs of ongoing message sequences. If a match is found and the message is a message which does not indicate a start of a new message sequence, the message is associated with the existing message sequence, e.g., as a next message in the sequence. The message sequence information includes information identifying devices (WT/AP) to which the message sequence corresponds, the messages in the sequence and the time information which can be used to determine the order of and/or timing between messages is stored in memory 312 of the network management system.

Operation proceed from step 915, in which a message is associated with a message sequence, to step 917, in which a message sequence vector for the message sequence with which a message was associated is generated or updated if the message sequence is an existing message sequence, based on the detected message. This may be done, for example, using the method shown in FIG. 11 and a message vector corresponding to the detected message obtained from the stored set of information shown in FIG. 6B or 7.

With the message sequence vector having been generated in step 917 operation proceeds to step 918 in which the generated message sequence vector is, examined, e.g., compared to the message sequence definitions, to determine if the message sequence vector corresponds to one of the message sequence clusters. This can be done by determining if each of the values in the generated message sequence vector fall within the range of the values used to define a message sequence cluster. For example, does the first value fall in the range of the first value in the message cluster definition, does the second value fall within the range of the second value in the message cluster definition and so on, with each of the values of the generated message sequence vector having to fall in the corresponding range specified in the cluster definition for there to be a match with the defined message sequence cluster definition with which a service quality, e.g., good or poor and/or a corrective action may be, and sometimes is, associated.

In step 920 a check is made as to whether the generated message sequence vector corresponds to a message vector sequence vector cluster which corresponds to poor service in which case a corrective action may be taken. Operation moves from step 920 to step 925 in which a decision is made to control processing. In step 925 if it is determined that the generated message sequence vector does not correspond to a message sequence vector cluster which is associated with poor service, operation returns to step 910 without a remedial action being taken. If however in step 925 it is determined that the message sequence vector corresponds to a message sequence cluster associated with poor service, e.g., having a service level experience (SLE) indictor value below a threshold indicative of poor communications service, operation proceeds from step 925 to step 930.

In step 930 a corrective action is identified, i.e., the remedial action associated with the message sequence vector cluster to which the message sequence was matched is determine by accessing memory, and then in step 950 the corrective, e.g., remedial action is implemented. The action may, and sometimes also does, include automatically restarting a component of the wireless system, switching to a backup element, changing operating parameters of at least one of the APs such as transmission power level being used, adding an SSID to AP, etc. In some embodiments, when no specific remedial action is specified, the method proceeds to step 950 without taking any specific action.

Operation proceeds from step 950 to step 952 where a report is generated and communicated to a user and/or system administrator. Step 952 is optional and may be skipped in some embodiments. In addition or as an alternative to automatically taking a corrective action in step 952 the management system may, and sometimes does, notify an end user or system administrator of a problem determined to be the cause of the poor service, e.g., by presenting a message on the user display 508 of FIG. 5, notifying the system administrator, e.g., by presenting a message on the display 308 of the NMS 136 of FIG. 1. In this way the user or administrator can be made aware of the problem in an automated way and take a corrective action or implement system maintenance which may be, and sometimes is, in addition to the automatically implemented corrective action. The corrective messages may be performed by sending a message to the processor 206 of AP 200 of FIG. 2 and reconfiguring it with new operating parameters, downloading newer SF version, restarting a specific radio in a given AP, as well as restarting one of the APs or one of the network servers.

Operation proceeds from step 952 to step 910, in which monitoring for the next message is performed. Operation proceeds directly from step 950 to step 910 in those embodiments where step 952 is skipped or not preformed.

Figure 10A:
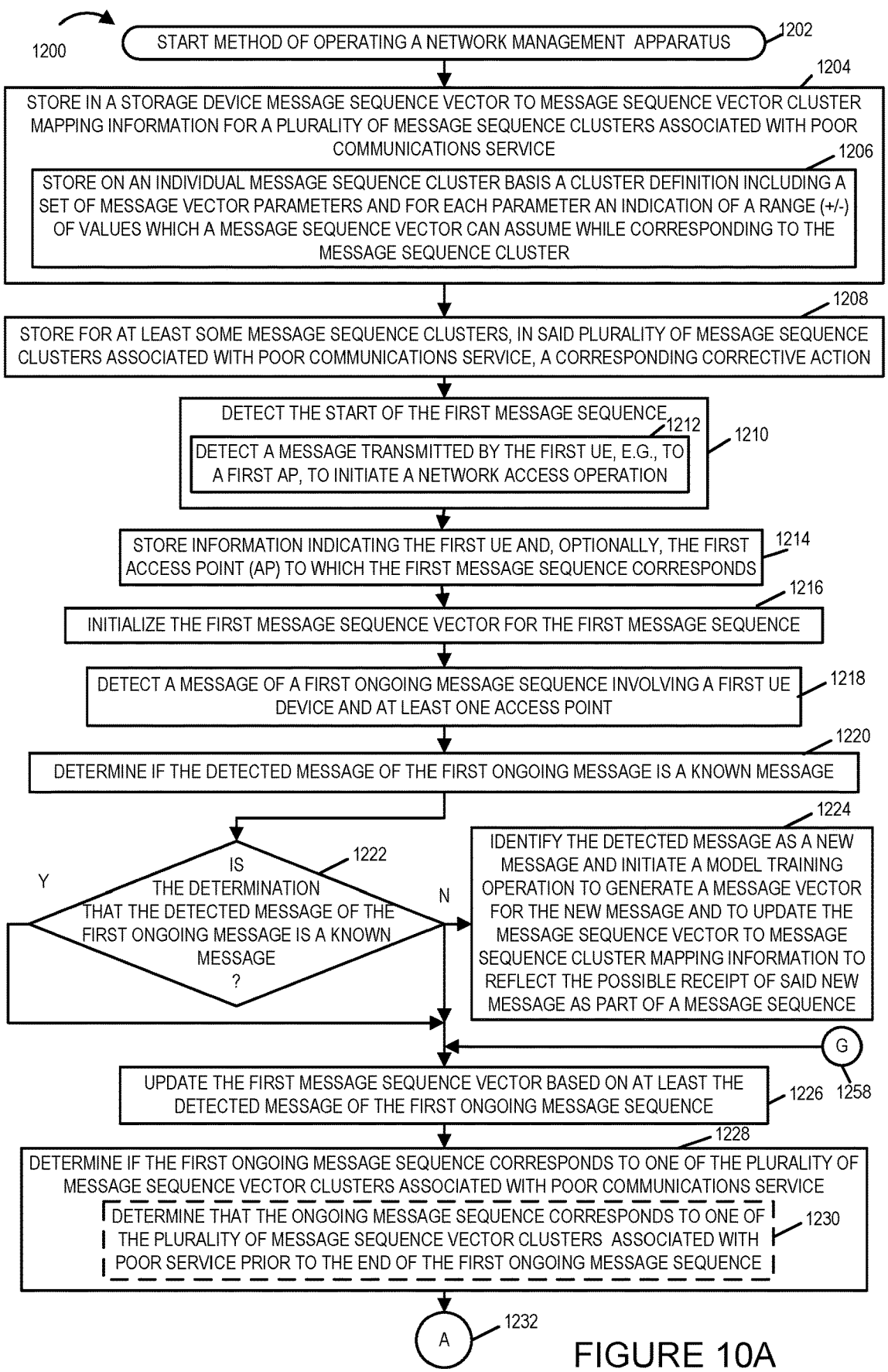
FIG. 10A is a first part of a flow chart showing a method that can be used in the system of FIG. 1.
Figure 10B:
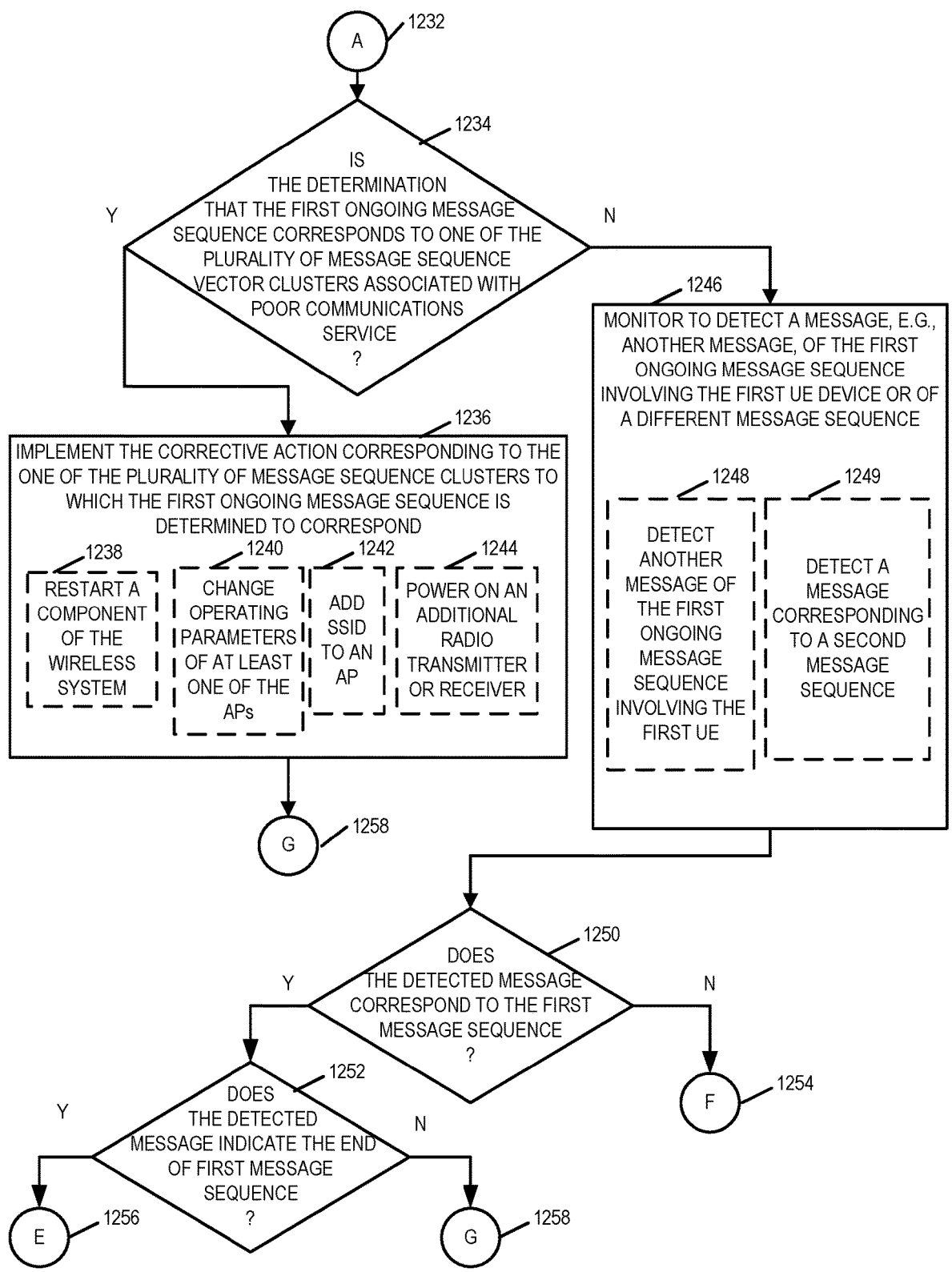
FIG. 10B is a second part of the flow chart showing the method that can be used in the system of FIG. 1.

Having discussed the training and utilization of the message sequence monitoring and matching process used to control automatic remedial actions without the need for user reporting of problems, FIG. 10 which shows how the method can be used in the system of FIG. 1 will be discussed. FIG. 10, which comprises the combination of FIGS. 10A, 10B and 10C, shows a more detailed implementation of the method shown in FIG. 9.

The method 1200 shown in FIG. 10 begins in start step 1202 with the network management apparatus, whether it is implemented as a separate network device or as part of an AP starting to execute the steps of the method, e.g. under control of the processor in the network management apparatus. Operation proceeds from step 1202 to step 1204 in which the network management apparatus stores in a storage device message sequence vector to message sequence vector cluster mapping information for a plurality of message sequence clusters associated with poor communications service. Step 1204 can, and in some embodiments does, involve the storing in step 1206 of message sequence vector cluster definitions such as the ones discussed above that are generated during training. The message sequence vector definitions can, and in some embodiments do, include a dimension value and a corresponding range for each of the N dimensions used to define a vector. In other embodiments a message sequence cluster is defined as a volume with the centroid of the cluster being indicated and distances from the centroid for each dimension being provided to provide a clear indication of the overall volume in the N dimensions.

In some embodiments, in step 1206 the network management system, e.g., network management apparatus, stores on an individual message sequence cluster basis a cluster definition including a set of message vector parameters and for each parameter an indication of a range (+/−) of values which a message sequence vector can assume while corresponding to the message sequence cluster. In some embodiments, for a message sequence to be determined to be associated with, e.g., correspond to, a message sequence cluster the different parameters of the message sequence must fall within the range of parameters defining the message sequence cluster, e.g., if one or more parameter values of a message sequence are outside the range of the corresponding message sequence cluster the message sequence is not determined to correspond to the defined message sequence cluster. In some embodiments, updating of the parameter values of a message sequence based on the receipt of one or more additional messages may result in a change in the parameter values at which point the message sequence being examined may be found to correspond to one of the known message sequence clusters, e.g., potentially a message sequence cluster corresponding to a bad service experience with a predetermine known corrective action associated therewith.

With the message sequence vector to message sequence cluster mapping information having been stored in step 1204, operation proceeds to step 1208 in which corrective action information is stored, on a per message sequence cluster basis for message sequence vector clusters known to correspond to a poor service experience, e.g., which may be do to a variety of reasons with different clusters normally corresponding to different failures and corrective actions. Thus in step 1208, for at least some individual message sequence clusters, in said plurality of message sequence clusters associated with poor communications service, a corresponding corrective action is stored.

With both message sequence vector to message sequence vector cluster mapping information having been stored along with corresponding corrective action information for message sequence vector clusters corresponding to poor communications service operation proceeds to step 1210 where messages are monitored and the start of a message sequence, e.g., a first message sequence is detected. Step 1210 includes in some embodiments step 1212 in which a message transmitted by a first UE, e.g., to a first AP, to initiate a network access operation is detected and recognized as the start of a first message sequence to be processed. As described above, the identification of a first message in a sequence of messages can be, and often is, used as an indicator that the previous message sequence has concluded either successfully, resulting in proper SLE, or unsuccessfully, resulting in poor SLE.

Operation proceeds from step 1210 to step 1214. In step 1214 information indicating the first UE and, optionally, the first access point (AP) to which the first message sequence corresponds is stored. Thus, in some embodiments, the communications pair corresponding to the first message sequence is known and can be used to determine if a subsequent message to be processed corresponds to the first sequence irrespective of the direction it is going to/from the AP based on the communications pair as can be determined from the source/destination of the message. In accordance with another embodiment other parameters such as the SSID and band information can be used as well.

In step 1216 a first message sequence vector is initialized based on the message which was the detected to start of the first message sequence vector. The message sequence vector for the first message sequence will be updated as additional messages corresponding to the first message sequence are detected and processed.

Operation proceeds from step 1216 to 1218, in which a message of the first message sequence, which is now in ongoing message sequence, is detected. The first ongoing message sequence involves the first UE and at least one access point. The detection, in some embodiments, may be based on a determination that a detected message is between the first UE device and the first access point which are a pair of devices to which the first message sequence corresponds.

Operation then proceeds to step 1220 where the detected message is checked to determine if it is a known message, e.g., is a message in the set of information stored in the network management apparatus and thus for which there is a known corresponding message vector value which can be used for further processing. If the message is not a known message a default, e.g., all zero message vector, can be used for as the message vector for the detected message or a message vector value can be determined from a training operation.

Operation proceeds from step 1220 to step 1222. In step 1222 a determination is made as to whether or not the detected message of the first ongoing message sequence is a known message. If the message is determined in step 1222 to be a known message, e.g., a message already in a message information set, such as the ones shown in FIGS. 6B and 7, and for which a message vector is known, operation proceeds from step 1222 directly to step 1226. Otherwise operation proceeds from step 1222 to steps 1224 and 1226 which may be performed in parallel. In step 1224 the detected message is identified as a new message and a model training operation is initiated to generate a message vector for the new message and to update the message sequence vector to message sequence cluster mapping information, e.g., message sequence vector cluster definitions (including potential modification to remedial actions associated with the new message vector cluster definition), to reference the possible receipt of the new message as part of a message sequence. While the training process may be initiated in step 1224, processing of the message with regard to the first message sequence can, and sometimes does, proceed to step 1226 without waiting for the training to be completed and with a default new message vector, e.g., all zeros, in some cases, being used as the message vector for a new message, while if the message is a known message the message vector corresponding to the detected message is obtained from the stored information, e.g., the information shown in FIG. 6B or 7.

In step 1226 the message sequence vector corresponding to the first message sequence is updated based on at least the detected message, e.g., using the message vector corresponding to the first message to perform a message sequence vector update as shown in FIG. 11.

With the message sequence vector having been updated for the first message sequence, operation proceeds from step 1226 to step 1228 where a determination is made, based on the updated first message sequence vector, whether the first message sequence, which at this point is still ongoing, corresponds to one of the plurality of message sequence vector clusters associated with poor service. Step 1228, in the case where the first message sequence corresponds to bad service for a reason which is the same or similar to the reason a cluster of message sequences also had poor service, will include step 1230 in which the network management apparatus determines that the ongoing message sequence corresponds to one of the plurality of message sequence vector clusters associated with poor service prior to the end of the first ongoing message sequence. It may take several messages of the first message sequence to be processed before the determination in step 1230 is made but as the message sequence vector of the first message sequence is updated the chance of matching it to a message sequence vector cluster, corresponding to good or bad service, increases.

Operation proceeds from step 1228 of FIG. 10A to step 1234 of FIG. 10B via connecting node A 1232. In step 1234 a determination is made whether or not the first ongoing message sequence correspond to one of the plurality of message sequence vector clusters associated with poor communications service. Note that it is important to determine whether or not the message sequence corresponds to a poor message sequence vector cluster since actions are to be taken to remedy poor service in such cases but no remedial action need be taken if the message sequence corresponds to good service or a match to a message sequence vector cluster cannot be determined, e.g., because too few messages of a sequence have been received and processed for a clear match to be made.

Operation proceeds from step 1234 to step 1236 if it is determined that the first message sequence vector corresponds to a message sequence vector cluster associated with poor service for which a remedial action is to be taken. In step 1236 the network management apparatus implements the corrective action stored in the set of message sequence cluster information corresponding to the one of the plurality of message sequence clusters to which the first ongoing message sequence is determined to correspond. In various embodiments, the corrective action is taken in real time while the first ongoing message sequence is still ongoing and has not been completed. In some embodiments the remedial action includes one or more of steps 1238, 1240, 1242 and 1244. Step 1238 includes restarting a component of the wireless system. Step 1240 includes changing operating parameters of at least one of the APs, e.g., the AP which is one of the participants in the first message sequence. Step 1242 includes adding an SSID to an AP. Step 1244 includes powering on an additional radio transmitter and/or receiver. In some embodiments, powering one an additional radio transmitter and/or radio receiver may be, and sometimes is, part of powering on a new AP or a sector of an existing AP. When the network monitoring device is in the first AP it may control the first AP directly to perform the remedial action. When the network monitoring device is outside the first AP it sends a control message to the first AP or another device to cause the remedial action to be taken thereby implementing the remedial action at the AP or other network device to which the control message is sent.

With the correction action having been taken in step 1236, operation can return to via connecting node G 1258 to step 1226 so that processing of messages can continue but hopefully with the remedial action causing a change in service quality that will result in a subsequent first message sequence vector no longer matching a message sequence vector cluster corresponding to poor service.

In some but not necessarily all embodiments, whether the poor SLE message sequence cluster has or does not have a remedial action associated with it, the method may, and often does, alert an IT technician or a system operator to the fact that the network management system 136 detected an issue with the system.

If in step 1234 processing of the first ongoing message sequence vector indicates that the message sequence vector does not correspond to a message sequence vector cluster associated with poor service, operation proceeds to step 1246 in which the system monitors to detect an additional message, e.g., another message of the first ongoing message sequence involving first UE device or a different message sequence, e.g., a message sequence between a second UE and one or more access points or a new message sequence involving the first UE and one or more access points. Step 1246 includes in some embodiments step 1248 which includes detecting another message of the first ongoing message sequence involving the first UE. Step 1246 in other cases, where a message of a different message sequence is detected, includes step 1249 which includes detecting a message corresponding to a second message sequence. The second message sequence may involve a different WT/AP pair or may be a new sequence including the first WT and first AP which were parties to the first message sequence.

Operation proceeds from step 1246 to step 1250. In step 1250 a determination is made as to whether the detected message detected in step 1246 corresponds to the first message sequence in which case operation proceeds to step 1252; otherwise, operation proceeds to step 1271 (see FIG. 10C) via connecting node F 1254.

In step 1252 a determination is made as to whether the message detected in step 1246 corresponding to the first message sequence indicates an end to the first message sequence in which case operation proceeds to step 1266 via connecting node E 1256; otherwise, operation proceeds via connecting node G 1258 to step 1226 for further processing and use in updating the message sequence vector corresponding to the first message sequence.

Referring now to the steps shown in FIG. 10C, in step 1266 the end of the first message sequence is detected, e.g., determined, based on the fact that the message was of a type indicating the end of a message sequence. End of message sequence may also be identified by detecting a time-out message due to system failing to reply with an expected message in a timely manner, or by detecting a start of message sequence message which leads to an inference that the previous message sequence concluded. With the end of the message sequence having been detected, operation proceeds to step 1268 in which a model training update operation is preformed using the first message sequence and knowledge of a first message cluster to which the first message sequence was determined to correspond as training information. Operation then proceeds to step 1269 wherein processing of the first message sequence stops. While processing of the first message sequence stops monitoring for messages corresponding to additional messages corresponding to other messages sequence will proceed on an ongoing basis.

Processing with regard to step 1271 will now be described. Step 1271 can be reached by a detected message corresponding to the start of a second sequence or a subsequent message in a second sequence. The start of a second sequence is handled differently than a subsequent message of the same sequence, since information about the second sequence needs to be initialized.

In step 1271 if it is determined that the detected message does not correspond to the start of the second message sequence, e.g., because it is a subsequent message in the second sequence, operation proceeds to step 1276. In step 1276 the detected message of the second message sequence is processed, e.g., by performing steps 1218 to 1269 but with the processing relating to the detected message corresponding the second message and second message sequence related values rather than the first message sequence. Thus in steps 1218 to 1269 "first" would be replaced with the term "second" but the processing is generally the same but with regard to the second message sequence rather than the first.

In step 1271 if it is determined that detected message corresponds to the start of the second message sequence, operation proceeds to step 1272 in which the start of the second message sequence involving a second UE is indicated as being detected initiating the move to step 1273, in which initialization information regarding the second message sequence is stored in memory. The stored information indicates the second UE and, optionally the second access point, to which the second message sequence corresponds. Once the initial message sequence information relating to the second message sequence is performed, steps 1216 to 1266 are performed for the second message sequence. This can be understood by replacing the references to the first message sequence in the recited steps with the second message sequence, replacing referenced to the first WT with references to the second WT, and replacing any other references to "first" in these steps to "second".

Thus it should be appreciated that messages in the second message sequence will be processed in the same manner as messages in the first message sequence and may trigger automatic remedial action if the second message sequence vector is determined to correspond to a message sequence cluster associated with poor service and for which a remedial action is specified in the stored information.

By processing messages corresponding to message sequences real time remedial action may be and sometimes is automatically taken to reduce or avoid poor communications service.

Various embodiments are possible some of which are presented in a list or lists below.

Numbered List of Exemplary Method Embodiments

Method Embodiment 1

A method of operating an apparatus, the method comprising: storing (1204) in a storage device message sequence vector to message sequence vector cluster mapping information for a plurality of message sequence clusters associated with poor communications service; storing (1208) for at least some individual message sequence clusters, in said plurality of message sequence clusters associated with poor communications service, a corresponding corrective action; detecting (1218) a message of a first ongoing message sequence between a first UE device and at least one access point, e.g., a first access point; updating (1226) a first message sequence vector based on at least the detected message of the first ongoing message sequence; determining (1228) if the first ongoing message sequence corresponds to (an individual one) one of the plurality of message sequence clusters associated with poor communications service; and in response to determining that the first ongoing message sequence corresponds to one of the plurality of message sequence clusters associated with poor communications service, performing (1236) the corrective action corresponding to the one of the plurality of message sequence clusters to which the first ongoing message sequence is determined to correspond.

Method Embodiment 2

The method of Method Embodiment 1, wherein storing (1204) in a storage device message sequence vector to message sequence cluster mapping information for a plurality of message sequence clusters associated with poor communications service includes storing (1206), on a per individual message sequence cluster basis a cluster definition including a set of message vector parameters and for each parameter an indication of a range (+/−) of values which a message sequence vector can assume while corresponding to the message sequence cluster. (In some embodiments, for a message sequence to be determined to be associated with, e.g., correspond to, a message sequence cluster the different parameters of the message sequence must fall within the range of parameters defining the message sequence cluster, e.g., if one or more parameter values of a message sequence are outside the range of the corresponding message sequence cluster the message sequence is not determined to correspond to the defined message sequence cluster. Updating of the parameter values of a message sequence based on the receipt of one or more additional messages may result in a change in the parameter values at which point the message sequence being examined may be found to correspond to one of the know message sequence clusters, e.g., potentially a message sequence cluster corresponding to a bad service experience with a predetermine known corrective action associated therewith.)

Method Embodiment 3

The method of Method Embodiment 1, wherein said step of determining (1228) if the first ongoing message sequence corresponds to (an individual one) one of the plurality of message sequence clusters associated with poor communications service determines (1230) that said ongoing message sequence corresponds to one of the one of the plurality of message sequence clusters associated with poor communications service prior to the end of the first ongoing message sequence. (In some embodiments, the determination is predictive in nature and that the determination can be successfully made in many cases prior to the end of the message sequence being received and, in many cases, before the user of the first UE to which the first message sequence corresponds notices an unsatisfactory level of communications service, with the cause of said unsatisfactory service being automatically addressed and/or corrected, in at least some situations, by implementing the corrective action associated with the message cluster to which the first message sequence is determined to correspond).

Method Embodiment 4

The method of Method Embodiment 1, further comprising: in response to determining that the first ongoing message sequence does not correspond to one of the plurality of message sequence clusters associated with poor communications service, monitoring (1246) to detect another message of the first ongoing message sequence involving the first UE device; and in response to detecting (1248) another message of the first ongoing message sequence involving the first UE device, repeating said steps of: i) updating (1226) the first message sequence vector based on at least the detected message of the first ongoing message sequence; ii) determining (1228) if the first ongoing message sequence corresponds to one of the plurality of message sequence clusters associated with poor communications service; and iii) in response to determining that the first ongoing message sequence corresponds to one of the plurality of message sequence clusters associated with poor communications service, performing (1236) the corrective action corresponding the one of the plurality of message sequence clusters to which the first ongoing message sequence is determined to correspond.

Method Embodiment 5

The method of Method Embodiment 4, wherein said corrective action is taken in real time while the first ongoing message sequence is still ongoing and has not been completed.

Method Embodiment 6

The method of Method Embodiment 4, further comprising: in response to determining that the first ongoing message sequence does not correspond to one of the plurality of message sequence clusters associated with poor communications service, monitoring (1246) to detect another additional message of the first ongoing message sequence involving the first UE device.

Method Embodiment 7

The method of Method Embodiment 1, further comprising: determining (1220) if the detected message of the first ongoing message sequence is a known message; and in response to determining that the detected message is not a known message, identifying (1224) the detected message as a new message and initiating a model training operation to generate a message vector for the new message and to update the message sequence vector to message sequence cluster mapping information to reflect the possible receipt of said new message as part of a message sequence.

Method Embodiment 8

The method of Method Embodiment 1, wherein the corrective action is one of: restarting (1238) a component (e.g., of the wireless system), changing (1240) operating parameters of at least one of the APs, adding (1242) SSID to AP, powering (1244) on an additional radio transmitter or receiver (may be part of powering on a new AP or sector of an existing AP), or alerting a system administrator of the service level degradation.

Method Embodiment 9

The method of Method Embodiment 1, further comprising, prior to detecting (1218) the message of a first ongoing message sequence: detecting (1210) the start of the first message sequence; storing (1214) information indicating the first UE to which the first message sequence corresponds; and initializing (1216) the first message sequence vector for the first message sequence.

Method Embodiment 10

The method of Method Embodiment 9, further comprising: detecting (1266) the end of the first message sequence;

and performing (1268) a model training update operation using said first message sequence and knowledge of a first message cluster to which the first message sequence was determined to correspond. (In some embodiments, the message cluster in this claim could be a good or bad service level message cluster with the end result and detected first message sequence being used to update message vector parameters and/or message cluster definitions thereby allowing for dynamic updating of the models being used based on received message sequences).

Method embodiment 11 The method of Method Embodiment 10, wherein detecting the end of the first message sequence is one of: detecting a first message in the following sequence indicative of previous message sequence termination; detecting a message explicitly indicating a successful message sequence; detecting a message explicitly indicating a failed message sequence; detecting a timeout message while waiting for next message of first message sequence.

Method Embodiment 12

The method of Method Embodiment 9, further comprising: detecting (1272) the start of a second message sequence involving a second UE; storing (1273) information indicating the second UE to which the second message sequence corresponds; and initializing (1274 including revised 1216) the second message sequence vector for the second message sequence.

Method Embodiment 13

The method of Method Embodiment 12, wherein detecting (1210) the start of the first message sequence includes detecting (1212) a message transmitted by the first UE to the first AP to initiate a network access operation.

Numbered List of Exemplary Apparatus Embodiments

Apparatus Embodiment 1

An apparatus (136 or 300), comprising: a processor (306) configured to: store (1204) in a storage device (312) message sequence vector to message sequence vector cluster mapping information for a plurality of message sequence clusters associated with poor communications service; store (1208) for at least some individual message sequence clusters, in said plurality of message sequence clusters associated with poor communications service, a corresponding corrective action; detect (1218) a message of a first ongoing message sequence involving a first UE device (138) and at least one access point (142); update (1226) a first message sequence vector based on at least the detected message of the first ongoing message sequence; determine (1228) if the first ongoing message sequence corresponds to (an individual one) one of the plurality of message sequence clusters associated with poor communications service; and in response to determining that the first ongoing message sequence corresponds to one of the plurality of message sequence clusters associated with poor communications service, perform (1236) the corrective action corresponding to the one of the plurality of message sequence clusters to which the first ongoing message sequence is determined to correspond.

Apparatus Embodiment 2

The apparatus (136 or 300) of Apparatus Embodiment 1, wherein said processor (306) is configured to store (1206), on a per individual message sequence cluster basis a cluster definition including a set of message vector parameters and for each parameter an indication of a range (+/−) of values which a message sequence vector can assume while corresponding to the message sequence cluster, as part of being configured to store (1204) in a storage device message sequence vector to message sequence cluster mapping information for a plurality of message sequence clusters associated with poor communications service. [In some embodiments, for a message sequence to be determined to be associated with, e.g., correspond to, a message sequence cluster the different parameters of the message sequence must fall within the range of parameters defining the message sequence cluster, e.g., if one or more parameter values of a message sequence are outside the range of the corresponding message sequence cluster the message sequence is not determined to correspond to the defined message sequence cluster. Updating of the parameter values of a message sequence based on the receipt of one or more additional messages may result in a change in the parameter values at which point the message sequence being examined may be found to correspond to one of the know message sequence clusters, e.g., potentially a message sequence cluster corresponding to a bad service experience with a predetermine known corrective action associated therewith.]

Apparatus Embodiment 3

The apparatus (136 or 300) of Apparatus Embodiment 1, wherein processor (306) is configured to determine (1230) that said ongoing message sequence corresponds to one of the one of the plurality of message sequence clusters associated with poor communications service prior to the end of the first ongoing message sequence, as part of being configured to determine (1228) if the first ongoing message sequence corresponds to (an individual one) one of the plurality of message sequence clusters associated with poor communications service.

Apparatus Embodiment 4

The apparatus (136 or 300) of Apparatus Embodiment 1, wherein said processor (306) is further configured to: monitor (1246) to detect another message of the first ongoing message sequence involving the first UE device (138), in response to determining that the first ongoing message sequence does not correspond to one of the plurality of message sequence clusters associated with poor communications service; and operate the apparatus to repeat said steps of: i) updating (1226) the first message sequence vector based on at least the detected message of the first ongoing message sequence; ii) determining (1228) if the first ongoing message sequence corresponds to one of the plurality of message sequence clusters associated with poor communications service; and iii) in response to determining that the first ongoing message sequence corresponds to one of the plurality of message sequence clusters associated with poor communications service, performing (1236) the corrective action corresponding the one of the plurality of message sequence clusters to which the first ongoing message sequence is determined to correspond, in response to detecting (1248) another message of the first ongoing message sequence involving first UE device.

Apparatus Embodiment 5

The apparatus (136 or 300) of Apparatus Embodiment 4, wherein said corrective action is taken in real time while the first ongoing message sequence is still ongoing and has not been completed.

Apparatus Embodiment 6

The apparatus (136 or 300) of Apparatus Embodiment 4, wherein said processor (306) is further configured to: monitor (1246) to detect another additional message of the first ongoing message sequence involving first UE device (138), in response to determining that the first ongoing message sequence does not correspond to one of the plurality of message sequence clusters associated with poor communications service.

Apparatus Embodiment 7

The apparatus (136 or 300) of Apparatus Embodiment 1, wherein said processor (300) is further configured to: determine (1220) if the detected message of the first ongoing message sequence is a known message; and identify (1224) the detected message as a new message and initiating a model training operation to generate a message vector for the new message and to update the message sequence vector to message sequence cluster mapping information to reflect the possible receipt of said new message as part of a message sequence, in response to determining that the detected message is not a known message.

Apparatus Embodiment 8

The apparatus (136 or 300) of Apparatus Embodiment 1, wherein the corrective action is one of: restarting (1238) a component (238, 240, 244 or 246) (e.g., of the wireless system (100)), changing (1240) operating parameters of at least one of the APs (142, 144, 150, 152, 160, 162, 170, 172) adding (1242) SSID to AP (142, 144, 150, 152, 160, 162, 170, or 172), powering (1244) on an additional radio transmitter (240 or 246) or receiver (238 or 244) (may be part of powering on a new AP or sector of an existing AP) or alerting a system administrator of the service level degradation; and wherein said processor (306) is configured to: restart (1238) a component (238, 240, 244 or 246) (e.g., of the wireless system (100)), change (1240) operating parameters of at least one of the APs (142, 144, 150, 152, 160, 162, 170, 172), add (1242) SSID to AP (142, 144, 150, 152, 160, 162, 170, or 172), power (1244) on an additional radio transmitter (240 or 246) or receiver (238 or 244) or alert a system administrator of the service level degradation, as part of being configured to perform a corrective action.

Apparatus Embodiment 9

The apparatus (136 or 300) of Apparatus Embodiment 1, wherein said processor (306) is further configured to: detect (1210) the start of the first message sequence; store (1214) information indicating the first UE (138) to which the first message sequence corresponds; and initialize (1216) the first message sequence vector for the first message sequence, said detecting, storing and initializing being performed prior to detecting (1218) the message of a first ongoing message sequence.

Apparatus Embodiment 10

The apparatus (136 or 300) of Apparatus Embodiment 9, wherein said processor (306) is further configured to: detect (1266) the end of the first message sequence; and perform (1268) a model training update operation using said first message sequence and knowledge of a first message cluster to which the first message sequence was determined to correspond.

Apparatus Embodiment 11

The apparatus (136 or 300) of Apparatus Embodiment 10 wherein said processor (306) is configured to detect: a first message in the following sequence indicative of previous message sequence termination; a message explicitly indicating a successful message sequence; a message explicitly indicating a failed message sequence; or a timeout message while waiting for next message of first message sequence, as part of being configured to detect the end of the first message sequence.

Apparatus Embodiment 12

The apparatus (136 or 300) of Apparatus Embodiment 9, wherein said processor (306) is further configured to: detect (1270) the start of a second message sequence involving a second UE (140); store (1272) information indicating the second UE (140) to which the second message sequence corresponds; and initialize (1274 including revised 1216) the second message sequence vector for the second message sequence. It should be appreciated that the at least one access point with which the second UE (140) communicates in the second message sequence can be the same access point, e.g., the first access point (142), involved in the first communications sequence involving the first WT (138) or another access point (144, 150, 152, 160, 162, 170, or 172).

Apparatus Embodiment 13

The apparatus (136 or 300) of Apparatus Embodiment 12, wherein said processor (306) is configured detect (1212) a message transmitted by the first UE (138) to the first AP (142) to initiate a network access operation, as part of being configured to detect (1210) the start of the first message sequence.

This application describes, among other things, a method for detecting system faults in real time and initiating a corrective process. Under specific conditions the method may predict issues as they evolve even before a user is adversely affected. We will refer to this early detection as predictive fault detection.

A system in accordance with this invention continuously monitors messages between a wireless device such as user equipment (UE) and at least one access point (AP). The messages, and location associated with the messages can be, and sometimes are, monitored and stored. In accordance with a specific embodiment, the timing between message arrival is observed and recorded as well.

The AP monitors and stores the message exchange with each UE including the associated time stamps. Similarly, the AP can, and sometimes does, store message exchange with the other servers in the system. These messages can be, but are not limited to, messages such as 801.11 messages between a wireless device and an access point comprising of messages such as Association Request, Association Response, Re-association Request, Re-association Response, Authentication request, Probe request, Probe Response, Power Save (PS) Poll, Request to Send (RTS), Clear to send (CTS), Acknowledgement (ACK), Data, etc.

A dictionary of all of the messages is created per specific link such as the wireless link between an AP and a wireless client is created. As illustrated in the above example, the dictionary may include the name of a message listed in the dictionary may include type, operation result (e.g., success or failure), and a reason code. Each message may be given an index number. In according with one embodiment, for some messages the dictionary may include also a column indicative of the time between a specific message and the preceding message. For messages that are identified to be first in a sequence timing information may be initialized to zero. Timing information may be incorporated by creating a two dimensional vector such as (mgs, delta t) where the msg is the specific monitored message, and delta t is the time of arrival of the message relative to the previous preceding message. In accordance with this embodiment, each vector is given a specific index number in the message dictionary. Alternatively, timing bins may be associated with each message. Each specific message and the associated bin are given a specific index number. The last bin for each message may serve as a catch-all bucket e.g., for all messages for which delta t is greater than a specific time e.g., 10 seconds. When multiple timing bins are associated with a specific message, each message bin may be assigned a different message index.

The system then proceeds to observe and decode all messages and message sequences that the AP monitors between wireless clients and the AP. Next, using the observed message sequences each message from the message dictionary is mapped into a semantic vector of n dimensions. We will refer to this mapping process as an embedding step. For example $$Msg\ l => [a(l,1), a(l,2) a(l,n)] \quad \text{Equation 1}$$

$$Msg\ k => [a(k,1), a(k,2) a(k,n)] \quad \text{Equation 2}$$

Where:
a(i, j), is the j element of the vector to which Msg i is mapped, and
all a(i, j) elements are real numbers.

In accordance with one embodiment the embedding is performed by the following procedure:
Observe messages between APs and associated user terminals.
Assign random numbers to the elements a(i, j) of each one of the message vectors such as Msg k.
Determine message sequences based on each message flow between an AP and associated terminal. A message sequence starts with an association request from a terminal such as "STA_ASSOC_IND" and continues until the next Association request. A message sequence (MS) can be described by $$MS=\{M1st, M2nd, M3rd, M(k-1), Mk, M(k+1), \ldots M(l-2), M(l-1), Ml\} \quad \text{Equation 3}$$

Where:
MS—a sequence of messages observed between a user terminal and at least one AP
Mk—The kth message in the MS message sequence
For each message in the message sequence MS other than the first and the last message perform the following $$Msg\ k=(Msg(k-1)+Msg(k+1))/2 \quad \text{Equation 4}$$

Where:
Msg k—The vector to which message k is being mapped
Similarly, the vector value associated with the first message in the message sequence is adopted by:

$$Msg\ 1st=(Msg\ 2nd+Msg\ 3rd)/2 \quad \text{Equation. 5}$$

Where:
Msg 1st—The vector to which the first message is being mapped
And the vector value associated with the last message in the message sequence is adopted by:

$$Msg\ l=(Msg(l-2)+Msg(l-1))/2 \quad \text{Equation. 6}$$

Msg l—The vector to which the last message is being mapped
Msg k—The vector to which message k is being mapped
Repeat steps d and e for each one of the message sequences observed in the system (between any AP and any user terminal) which is determined in step c.

In accordance with one preferred embodiment, the process described above continues to adopt the values to which each message is mapped based on continuously observed message sequence.

In accordance with yet another embodiment, the method calculates for each one of the steps described in equations 4, 5, and 6 the amount by which each vector is changed. If the system determines that the amount by which continuous vector value adaptation modifies the absolute length of the vector by less than a predetermined threshold, the adaptation is stopped.

In accordance with yet another aspect of the invention, the adaptation is restarted anew if the system detects for the first time a new message which has not yet been added to the dictionary.

In accordance with another embodiment, machine learning (ML) such as long short time memory (LSTM) may be employed to perform the embedding. The values to which each message is mapped are based on the order and frequency each message in the observed sequences of messages.

The specifics of the ML algorithm used is described in "Understanding LSTM Networks" http://colah.github.io/posts/2015-08-Understanding-LSTMs) which is hereby incorporated by reference in its entirety. Other embedding algorithms may be used to map the messages from the message dictionary to associated vectors. The dimension of the vector is determined empirically to provide proper distinction between dissimilar messages and keep similar messages closer to each other. Dimensions between 15 and 30 are found to work best in our specific case. For example, the closeness of messages to each other may be measured by the distance between the two vectors that represent the two messages. Messages that follow each other often may be considered as similar and as such the distance between these two messages may be small. On the other hand, messages that rarely or never follow each other may be considered dissimilar and as such the distance between two such messages may be large. The distance between vectors may be calculated as the mean root square of the distance between the elements of the two vectors that represent the two messages $$Distance(vi, vj)=Sqr[(a(i,1)-a(j,1))^{}2+ \ldots +(a(i,n)-a(j,n))^{}2)] \quad \text{Equation 7}$$

or as a weighted root mean square where a specific dimension gets higher weight.

$$Weighted\ Distance(vi, vj)=Sqr[W1^{*}(a(i,1)-a(j,1))^{**}2+ \ldots +Wn^{*}(a(i,n)-a(j,n))^{**}2)] \quad \text{Equation. 8}$$

Where:
Wk is the weighted importance of a specific dimension of the vectors

The processing of the messages can be performed in the AP or in any other server attached to the network such as the network management server.

Next, the vectors associated with each message from the message dictionary are used to map sequence of messages into an associated vector. In its simplest form, this mapping can take the form of averaging the vectors of all the messages in a message flow sequence:

$$\text{Seq Vec} = \text{sum}(V1+V2+V1)/l \quad \text{Equation 9}$$

Where:

Seq Vec is a vector representing a message flow sequence

M is the number of messages in the message sequence flow

And l is the number of messages in a specific message sequence

In accordance with another preferred embodiment, rather than using equation 9 to obtain the message sequence vectors, ML models such as sequence-to-sequence models or recurrent neural networks (RNNs) may be used to associate a message sequence flow with a specific vector. In either case, each observed message sequence is mapped into a corresponding message sequence vector.

Well known ML techniques (e.g., K-mean clustering) are used to map the message sequence vectors (vectors associated with each messaging sequence) into clusters of messaging sequences. For example, a cluster of messages sequence may be a collection of message sequence vectors that exhibit a short distance between the various message sequences vectors where the distance between message sequence vectors is comprise of the example distances expressed in equations 7 or 8 above.

In accordance with one embodiment, after the clusters are identified, they undergo weak supervision labeling process. As part of this process, a network administrator may examine the various clusters and label them as normal message flows or message flows which are indicative of system issues. Normal message flows are associated with system operations which do not exhibit any end user or end device issues. Message flows that are indicative of system issues are associated with sub-standard wireless network operation which may, and often does, impact the system level experience (SLE) of an end user or of devices attached to the wireless network.

In according to another embodiment, the process of labeling the clusters of message sequences is executed automatically. The system level experience (SLE) of each wireless device (such as connect time, throughput, coverage, capacity, roaming, success to connect, AP availability, etc.) experienced by each UE can be, and sometimes is, monitored. The monitored parameters may comprise, but are not limited to, connect time, throughput, coverage (RSSI level), capacity, roaming, success to connect to the wireless network, and AP availability. When a monitored parameter meets specifications (either above or below a specific threshold), the parameter is marked as good performance or pass (along the specific dimension). Accordingly, the message sequence associated with the observed good SLE (along all SLE dimensions) is marked as message sequence that is associated with proper SLE. However, when a monitored parameter does not meet specifications (either below or above a specific threshold), the parameter is marked as poor performance or fail and consequently the message sequence associated with this poor SLE is marked as message sequence associated with lesser SLE.

Clusters of message sequences which exhibited good SLE are marked accordingly as clusters of message sequences of good SLE. Similarly, message sequence clusters which are associated with poor SLE observation may be marked, either automatically or manually, as undesired or abnormal message sequence clusters.

In either scenario, all clusters of message sequences are divided into numerous multi-dimensional clusters: those that would result in good SLE, and those that would result in poor SLE. The different message sequence vector clusters may be, and often are, associated with a cluster index, e.g., a numerical index.

For each cluster of message sequence vectors which were identified as resulting in poor SLE, a network administrator may tag each message sequence vector cluster with a specific network state and a corrective action that may resolve or alleviate the root cause of the issue. For example these corrective actions may be selected from restarting an AP, changing the transmit power of a specific transmitter is an AP, adding an SSID to a specific AP, etc.

The message sequences listed in the paragraph are a few examples of message flows which result correspond to poor SLE, e.g., poor service. Each of the listed message flows corresponding to poor service will map to a cluster of message sequence vectors with which poor service is associated and a corrective action may be and sometimes is associated. Different flows corresponding to poor communications service may and sometimes do map to different message sequence vector clusters associated with poor service:

STA_ASSOC_IND, STA_DEAUTH, STA_AUTHORIZATION_FAILED

STA_ASSOC_IND, STA_DEAUTH, STA_AUTHORIZED, STA_AUTHORIZATION_FAILED, STA_DHCP_ACK, STA_DNS_OK, ARP_DEFGW_SUCCESS, STA_AUTHORIZATION_FAILED, STA_DEAUTH, STA_DEAUTH

STA_ASSOC_IND, STA_AUTHORIZATION_FAILED, STA_DEAUTH, STA_DISASSOC, STA_DEAUTH, STA_AUTHORIZATION_FAILED

STA_ASSOC_IND, STA_DEAUTH, STA_DEAUTH, STA_DEAUTH, STA_AUTHORIZED, STA_AUTHORIZATION_FAILED

STA_ASSOC_IND, STA_DEAUTH, STA_DEAUTH, STA_DEAUTH, STA_AUTHORIZATION_FAILED, ARP_DEFGW_SUCCESS

The following message sequences listed in this paragraph are a few examples of good message sequences associated with good communications service, e.g., as may be indicated by a good SLE:

STA_ASSOC_IND, STA_DHCP STUCK, 1005, STA_DHCP_ACK, STA_DEAUTH, STA_DISASSOC_IND, STA_DISASSOC STA_DEAUTH, STA_DEAUTH STA_DEAUTH, STA_DEAUTH STA_DEAUTH, STA_DEAUTH, STA_DEAUTH, STA_DEAUTH, STA_DEAUTH, STA_DEAUTH, STA_DEAUTH

STA_ASSOC_IND, STA_AUTHORIZED, STA_DHCP_ACK ARP_DEFGW_SUCCESS, STA_DNS_OK STA_DISASSOC, STA_DEAUTH, STA_DEAUTH STA_DEAUTH, STA_DEAUTH, STA_DEAUTH, STA_DEAUTH, STA_DEAUTH STA_DEAUTH, STA_DEAUTH, STA_DEAUTH, STA_DEAUTH, STA_DEAUTH, STA_DEAUTH

STA_ASSOC_IND, STA_AUTHORIZED, STA_DNS_OK, STA_DHCP_ACK, ARP_DEFGW_SUCCESS, STA_DHCP_ACK STA_DHCP_ACK, STA_DHCP_ACK, DEFGW_ARP_TX_CONTINUOUS, STA_DHCP_ACK, STA_DHCP_ACK DEFGW_ARP_TX_CONTINUOUS,

STA_DHCP_ACK STA_DHCP_ACK, STA_DHCP_ACK
STA_DEAUTH, STA_DEAUTH STA_DEAUTH, STA_DEAUTH

The indexed and tagged cluster of message sequence vectors is considered to be a message sequence model (or shortly, a messaging model) that can be used to classify any future message sequence. It should be noted that the labeling of the message clusters/vectors is not binary. The labeling actually defines multiple clusters that may be associated with different scenarios of message flows such as: proper message flows, slow connect, failed roaming, portal redirect, fail to connect, successful roaming, etc.

The process of training the messaging model can be done either periodically or occasionally as new messages are observed. The model evaluation may be done in the APs, in a network attached server, or in collaboration between the APs and network attached servers. Additionally, the message sequences may be observed and the message model may be constructed for a given sub network, a geographical site, a corporation, globally for multiple locations, globally for multiple enterprises, of for any other desired collection of APs.

Although the process above was described based on the message flow between wireless clients and an AP, those skilled in the art should be able to recognize that our invention equally applies to message sequences between an AP and any other server in the network, as well as any combination of message sequences observed by the AP between an AP and any other component or components of the network.

Once the messaging model is established, it may be used to monitor the message sequences between any AP and any wireless device and/or messages between the AP and any adjacent component in wireless network. Accordingly, this message sequence model can be used to monitor any other network. Alternatively, transfer learning (such as the one described in Pratt, L. Y. (1993). "Discriminability-based transfer between neural networks" (PDF). NIPS Conference: Advances in Neural Information Processing Systems 5. Morgan Kaufmann Publishers. pp. 204-211) can be used where a site specific personalized message model can be constructed for each different device or sites to represent the specific behavior of that device or the specific site, respectively. The specifics of transferring the parameters from one ML model to another one is well known; for example see "Discriminability-Based Transfer between Neural Networks" by L. Y. Pratt Department of Mathematical and Computer Sciences Colorado School of Mines Golden, Colo. 80401 http://papers nips.cc/paper/641-discriminability-based-transfer-between-neural-networks.pdf. Another good explanation is provided by "A Gentle Introduction to Transfer Learning for Deep Learning" https://machinelearningmastery.com/transfer-learning-for-deep-learning/. Once the model from another site is used, a personalization process may start by using a global message sequence model based on message sequence model from other sites or from other enterprises. With time, as the APs on the specific site monitor and record message sequences between the local wireless devices and local APs, site specific message sequences may be recorded and used to train (using ML algorithm as described above) a site specific message sequence model which reflect better the behavior and interactions between wireless devices and APs on that specific site.

Once the message sequence model is constructed, all new messages between UEs and APs are mapped into a message sequence vector in a similar process to the one described above. The cluster to which the observed message sequence vector belongs is identified. For example, ML may classify the vector as belonging to one of the clusters previously identified. Alternatively, the message sequence vector may be associated with the cluster that is closest to its centroid. Where the centroid of the cluster may be defined as $$\text{Cluster Centroid} = (\text{Sum of vectors in the cluster})/N \quad \text{Equation 10}$$

Where:
N is the number of message sequence vectors in the cluster

In either case, the message is associated in real time with a specific message sequence vector cluster. As a result the process indicates in real-time a specific network state such as good SLE or undesired state of UE, AP, or any other component of a wireless network. Additionally, based on the specific message sequence vector cluster, the specific message sequence cluster may provide corrective actions that the system may take to alleviate the root cause of the poor SLE.

For example, when undesired or abnormal states are encountered, one or more of the following actions may be invokes: a system admin can be notified, the user may be notified that an issue with his system has been detected and a remedy is being actively pursued, or a corrective action may take place based on the nature of the issue. Example for the corrective actions that may be, and often are, initiated include but are not limited to: invoking radio resource manager to rebooting of an AP, changing power of a specific radio in a specific AP, adding SSID configuration to a specific AP, changing channel on an AP or set of APs, etc.

In accordance with yet another specific embodiment, virtual network administrator (VNA) may be invoked to analyze any issue and invoke remedial actions. Temporal information (time related information) may be used in the process of invoking VNA. This tells the VNA what time window should be examined for analyzing the issue. Spatial information (which AP and what band what WLAN, what client) is also provided as input for the VNA.

The VNA utilizes the temporal and spatial information as well as its own data to analyze the root cause of the underlying issue and take a remedial corrective action.

Although the above was described with respect to wireless networks, those skilled in the art will recognize the same methods apply to wired, optical and other networks as well.

The determination that a message sequence corresponds to poor service is predictive in nature in some cases. The determination can be successfully made in many cases prior to the end of the message sequence being detected and, in many cases, before the use of the first UE to which a first message sequence corresponds notices an unsatisfactory level of communications service. In many cases the cause of said unsatisfactory service being automatically addressed and corrected in at least some situations by implementing the corrective action associated with the message sequence cluster to which the first message sequence is determined to correspond.

Numerous variations on the above described methods and apparatus are possible.

The techniques of various embodiments may be implemented using software, hardware and/or a combination of software and hardware. Various embodiments are directed to apparatus, e.g., management entities, e.g., a network monitoring node, routers, gateways, access points, DHCP servers, DNS servers, AAA servers, user equipment devices, e.g., wireless nodes such as mobile wireless terminals, base stations, communications networks, communications systems. Various embodiments are also directed to methods, e.g., method of controlling and/or operating a communications device or devices, e.g., a network management node, an access point, wireless terminals (UEs), base stations, control nodes, DHCP nodes, DNS servers, AAA nodes, Mobility Management Entities (MMEs), networks, and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments devices and nodes described herein are implemented using one or more modules to perform the steps corresponding to one or more methods, for example, signal generation, transmitting, processing, analyzing, and/or receiving steps. Thus, in some embodiments various features are implemented using modules. Such modules may be implemented using software, hardware or a combination of software and hardware. In some embodiments each module is implemented as an individual circuit with the device or system including a separate circuit for implementing the function corresponding to each described module. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and associated hardware, to perform one or more of the steps of the above-described method(s). Some embodiments are directed to a device including a processor configured to implement one, multiple or all of the steps of one or more methods of the invention.

In some embodiments, the processor or processors, e.g., CPUs, of one or more devices, e.g., communications devices such as network management nodes, wireless terminals (UEs), and/or access nodes, are configured to perform the steps of the methods described as being performed by the devices. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a communications device, e.g., user equipment, with a processor which includes a module corresponding to each of the steps of the various described methods performed by the device in which the processor is included. In some but not all embodiments a communications device includes a module corresponding to each of the steps of the various described methods performed by the device in which the processor is included. The modules may be implemented purely in hardware, e.g., as circuits, or may be implemented using software and/or hardware or a combination of software and hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating a communications device, e.g., a network management node, an access point, a base station, a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of a communications system including cellular, WiFi, Bluetooth and BLE, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), WiFi, Bluetooth, BLE, and/or various other types of communications techniques which may be used to provide wireless communications links between access nodes and wireless nodes. In some embodiments the access nodes are implemented as base stations which establish communications links with user equipment devices, e.g., mobile nodes, using WiFi, Bluetooth, BLE, OFDM and/or CDMA. In various embodiments the wireless nodes are implemented as notebook computers, personal data assistants (PDAs), or other portable devices including receiver/transmitter circuits and logic and/or routines, for implementing the methods.

What is claimed is:

1. A method performed by hardware processing circuitry, comprising:
    storing, in a storage device, a plurality of mappings, each mapping associating a unique message sequence vector to with one of a plurality of message sequence vector clusters, each of the message sequence vector clusters associated with poor communications service;
    storing for each of the message sequence vector clusters in the plurality of message sequence clusters, a corresponding corrective action;
    detecting a plurality of messages of a first message sequence involving a first user equipment (UE) device and at least one access point;

updating a first message sequence vector representing the first message sequence based on at least the detected plurality of messages of the first message sequence;
determining, based on the plurality of mappings, if the first message sequence vector is within a vector space volume of one of the plurality of message sequence vector clusters; and
selectively performing, based on the determining, the stored corrective action corresponding to the one of the plurality of message sequence vector clusters.

2. The method of claim 1, further comprising:
in response to determining that the first message sequence does not occupy a vector space volume of any of the plurality of message sequence vector clusters, monitoring to detect another message of the first message sequence; and
in response to detecting another message of the first message sequence involving the first UE device:
determining if the first message sequence vector is within a vector space volume of one of the plurality of message sequence vector clusters, and
in response to determining that the first message sequence vector is within the vector space volume of the one of the plurality of message sequence vector clusters, performing the stored corrective action corresponding to the one of the plurality of message sequence vector clusters.

3. The method of claim 1, further comprising:
second determining if the detected message of the first ongoing message sequence is a known message; and
in response to determining that the detected message is not a known message, training a model to generate a message vector for the detected message and updating the at least one of the plurality of mappings to indicate the second message is part of a message sequence.

4. The method of claim 1,
wherein the corrective action is performed while the first message sequence is not complete; and
wherein the corrective action is one of: restarting a component, changing operating parameters of an access point (AP), adding SSID to an AP, or powering on a radio transmitter or receiver.

5. The method of claim 1, further comprising:
detecting a start of the first message sequence;
storing information associating the first UE with the first message sequence; and
initializing the first message sequence vector in response to the detecting.

6. The method of claim 5, further comprising:
detecting an end of the first message sequence;
second determining, in response to the detecting of the end, an association between the first message sequence vector and a first message sequence vector cluster of the plurality of message sequence vector clusters; and
training a model to associate the first message sequence vector and the first message sequence vector cluster in response to the second determining.

7. The method of claim 6, wherein detecting the end of the first message sequence comprises at least one of:
detecting a message indicating the first message sequence was successfully completed;
detecting a failure associated with the first message sequence; or
detecting a message indicating the first message sequence timed out.

8. The method of claim 1, further comprising:
generating, based on the detected message, a message vector to indicate two or more of a type of the detected message, a frequency of an occurrence of the message type in training data of a machine learning model, a relative position of the detected message in a message sequence, and a length of the message sequence, wherein the updating of the first message sequence vector is based on the message vector and the machine learning model.

9. The method of claim 8, further comprising:
further generating the message vector based on a first message positioned immediately prior to the detected message in the first message sequence; and
further generating the message vector based on a second message positioned immediately subsequent to the detected message in the first message sequence.

10. The method of claim 1, wherein determining, based on the plurality of mappings, the first message sequence vector is within a vector space volume of the one message sequence vector cluster comprises evaluating a distance between the first message sequence vector and a centroid within the vector space of the one message sequence vector cluster.

11. An apparatus, comprising:
a hardware processor;
one or more hardware memories storing instructions that when executed configure the hardware processor to perform operations comprising:
storing in a storage device, a plurality of mappings, each mapping associating a unique message sequence vector with one of a plurality of message sequence vector clusters, each of the message sequence vector clusters associated with poor communications service;
storing for each of the plurality of message sequence vector clusters, a corresponding corrective action;
detecting a plurality of messages of a first message sequence involving a first user equipment (UE) device and at least one access point;
updating a first message sequence vector based on at least the detected plurality of messages of the first message sequence;
determining if the updated first message sequence vector is within a vector space volume of one of the plurality of message sequence vector clusters; and
in response to the determining, selectively performing the stored corrective action corresponding to the one of the plurality of message sequence vector clusters.

12. The apparatus of claim 11, the operations further comprising:
monitoring to detect another message of the first message sequence in response to determining that the first message sequence vector is not within a vector space volume of one of the plurality of message sequence vector clusters;
further updating the first message sequence vector based on at least the detected another message,
second determining if the further updated first message sequence vector is within a vector space volume of one of the plurality of message sequence vector clusters, and
in response to the second determining, selectively performing the stored corrective action corresponding to the one of the plurality of message sequence vector clusters.

13. The apparatus of claim 12, the operations further comprising:
generating, based on the detected message, a message vector to indicate a type of the detected message, a frequency of an occurrence of the message type in training data of a machine learning model, a relative position of the detected message in a message sequence, and a length of the message sequence, wherein the updating of the first message sequence vector is based on the message vector and the machine learning model.

14. The apparatus of claim 11, the operations further comprising:
identifying the detected message as a new message;
in response to the identifying, initiating a model training operation to generate a message vector for the new message; and
in response to the identifying, updating the at least one of the plurality of mappings to indicate the detected message is part of a message sequence.

15. The apparatus of claim 11, wherein the corrective action is one of: restarting a component of a wireless system, changing operating parameters of an access point (AP), adding a SSID to an AP, or powering on a transmitter or a receiver; and
the operations further comprising restarting a component, changing operating parameters of at least one of the APs, adding SSID to AP, or powering on an additional radio transmitter or receiver, as part of being configured to perform a corrective action.

16. The apparatus of claim 11, the operations further comprising:
detecting a start of the first message sequence;
storing information indicating the first UE to which the first message sequence corresponds; and
initializing the first message sequence vector for representing the first message sequence, wherein the detecting, storing and initializing performed prior to detecting (1218) the message of a first message sequence.

17. The apparatus of claim 16, the operations further comprising:
detecting an end of the first message sequence; and
training a model based on an association between the first message sequence and the one message sequence vector cluster.

18. The apparatus of claim 16, the operations further comprising:
detecting a start of a second message sequence involving a second UE;
storing information indicating the second UE to which the second message sequence corresponds; and
initializing a second message sequence vector for the second message sequence.

19. The apparatus of claim 16, the operations further comprising second detecting a message transmitted by the first UE to an AP to initiate a network access operation wherein the detecting of the start of the first message sequence is based on the second detecting.

20. A non-transitory computer readable medium including a first set of computer executable instructions which when executed configure a hardware processor to perform operations comprising:
storing, in a storage device, a plurality of mappings, each mapping associating a unique message sequence vector with one of a plurality of message sequence vector clusters, each of the message sequence vector clusters associated with poor communications service;
storing for each of the message sequence vector clusters, in the plurality of message sequence clusters, a corresponding corrective action;
detecting a plurality of messages of a first message sequence involving a first user equipment (UE) device and at least one access point;
updating a first message sequence vector based on at least the detected plurality of messages of the first message sequence;
determining, based on the plurality of mappings, if the first message sequence is within a vector space volume of one of the plurality of message sequence vector clusters; and
selectively performing, based on the determining, a corrective action corresponding to the one of the plurality of message sequence vector clusters.

* * * * *